(12) United States Patent
Honda et al.

(10) Patent No.: US 12,117,697 B2
(45) Date of Patent: Oct. 15, 2024

(54) LIQUID CRYSTAL DISPLAY DEVICE

(71) Applicant: Sharp Display Technology Corporation, Kameyama (JP)

(72) Inventors: Mariko Honda, Kameyama (JP); Nobuhiro Waka, Kameyama (JP); Hiroyuki Hakoi, Kameyama (JP); Takahiro Sasaki, Kameyama (JP); Takashi Satoh, Kameyama (JP); Akira Sakai, Kameyama (JP); Seiji Maeda, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/384,131

(22) Filed: Oct. 26, 2023

(65) Prior Publication Data

US 2024/0176192 A1 May 30, 2024

(30) Foreign Application Priority Data

Nov. 29, 2022 (JP) .................................. 2022-190113
Jul. 31, 2023 (JP) .................................. 2023-124430

(51) Int. Cl.
*G02F 1/1343* (2006.01)
*G02F 1/1333* (2006.01)
*G02F 1/1335* (2006.01)
*G02F 1/1337* (2006.01)

(52) U.S. Cl.
CPC ............... *G02F 1/134345* (2021.01); *G02F 1/133345* (2013.01); *G02F 1/133514* (2013.01); *G02F 1/133553* (2013.01); *G02F 1/133742* (2021.01); *G02F 2201/52* (2013.01)

(58) Field of Classification Search
None
See application file for complete search history.

(56) References Cited

U.S. PATENT DOCUMENTS

| 8,692,758 B2 | 4/2014 | Matsuda et al. | |
| 2003/0016322 A1* | 1/2003 | Ha | G02F 1/133555 349/113 |
| 2003/0016324 A1* | 1/2003 | Jisaki | G02F 1/1393 349/117 |

(Continued)

FOREIGN PATENT DOCUMENTS

| JP | H04-040457 A | 2/1992 |
| JP | 3394926 B2 | 4/2003 |

(Continued)

*Primary Examiner* — Phu Vu
(74) *Attorney, Agent, or Firm* — ScienBiziP, P.C.

(57) ABSTRACT

A liquid crystal display device includes a first substrate, a second substrate, and a liquid crystal layer. Each pixel includes a reflective region and a transmissive region. The first substrate includes a reflective layer, an interlayer insulating layer provided to cover the reflective layer, and a pixel electrode provided on the interlayer insulating layer in each pixel. The interlayer insulating layer has a recess portion which is defined by a bottom surface and an inclined side surface and at least a part of which is located in the transmissive region. A depth of the recess portion of the interlayer insulating layer is 0.5 μm or more, and an inclination angle of the inclined side surface of the recess portion is 25° or less.

18 Claims, 12 Drawing Sheets

(56) References Cited

U.S. PATENT DOCUMENTS

| | | | |
|---|---|---|---|
| 2005/0001960 A1* | 1/2005 | Kim | G02F 1/133553 349/114 |
| 2007/0182907 A1* | 8/2007 | Ohmuro | G02F 1/133514 349/107 |
| 2009/0310070 A1* | 12/2009 | Ishii | G02F 1/133555 349/114 |
| 2010/0295841 A1 | 11/2010 | Matsuda et al. | |
| 2012/0147306 A1* | 6/2012 | Moriya | G02F 1/13394 349/113 |
| 2013/0320334 A1 | 12/2013 | Yamazaki et al. | |
| 2021/0181576 A1 | 6/2021 | Sasaki et al. | |

FOREIGN PATENT DOCUMENTS

| | | |
|---|---|---|
| JP | 5036864 B2 | 9/2012 |
| JP | 2014-007399 A | 1/2014 |
| JP | 2021-096461 A | 6/2021 |

* cited by examiner

BLACK DISPLAY    DARK GRAY LEVEL DISPLAY    BRIGHT GRAY LEVEL DISPLAY    WHITE DISPLAY

LIQUID CRYSTAL DISPLAY DEVICE

BACKGROUND

1. Field

The present disclosure relates to a liquid crystal display device, and particularly, to a liquid crystal display device in which each pixel includes a reflective region and a transmissive region.

2. Description of the Related Art

In recent years, a transflective type (may be referred to as a "transmission/reflection combined type") liquid crystal display device (LCD) is used as a display device for a smart watch or a digital signage for outdoor advertising. The transflective type LCD has, in one pixel, a reflective region for performing display in a reflective mode (reflective display) and a transmissive region for performing display in a transmissive mode (transmissive display). Therefore, high viewability in an outdoor environment under sunlight can be obtained by the reflective display using the outside light, and information can be confirmed at night by the transmissive display using the backlight.

The applicant of the present application proposes, in Japanese Unexamined Patent Application Publication No. 2021-96461, a transflective type LCD capable of improving the brightness of the reflective display and the transmissive display. In the transflective type LCD disclosed in Japanese Unexamined Patent Application Publication No. 2021-96461, the reflectance is improved by a two-stage electrode structure in which a reflective electrode (reflective layer) and a transparent electrode (pixel electrode) are separated from each other via an interlayer insulating layer. In addition, Japanese Unexamined Patent Application Publication No. 2021-96461 also describes a multi-gap structure in which a cell gap in the reflective region and a cell gap in the transmissive region are different. By adopting the multi-gap structure, the transmittance is improved.

SUMMARY

However, according to the study by the inventors of the present application, in the transflective type LCD having the multi-gap structure, it is understood that the cell gap is different for each pixel, and the display failure may occur due to the cell gap.

An embodiment of the present disclosure is made in view of the above-described points, and it is desirable to provide a transflective type liquid crystal display device in which the occurrence of display failure due to a nonuniform cell gap is suppressed.

The present specification discloses a liquid crystal display device described in the following items.

Item 1

A liquid crystal display device includes a first substrate, a second substrate opposite to the first substrate, and a liquid crystal layer provided between the first substrate and the second substrate. The liquid crystal display device has a plurality of pixels arranged in a matrix including a plurality of rows and a plurality of columns. Each of the plurality of pixels includes a reflective region for performing display in a reflective mode and a transmissive region for performing display in a transmissive mode. The first substrate includes a reflective layer, an interlayer insulating layer provided to cover the reflective layer, and a pixel electrode provided on the interlayer insulating layer in each of the plurality of pixels. The interlayer insulating layer has a recess portion which is defined by a bottom surface and an inclined side surface and at least a part of which is located in the transmissive region. A depth of the recess portion of the interlayer insulating layer is 0.5 μm or more. An inclination angle of the inclined side surface of the recess portion is 25° or less.

Item 2

The liquid crystal display device according to item 1, the inclination angle of the inclined side surface of the recess portion is 22° or less.

Item 3

The liquid crystal display device according to item 1 or 2, the bottom surface and the inclined side surface of the recess portion are located in the transmissive region.

Item 4

The liquid crystal display device according to any one of items 1 to 3, the reflective layer has an uneven surface structure.

Item 5

The liquid crystal display device according to any one of items 1 to 3, the reflective layer has a substantially flat surface.

Item 6

The liquid crystal display device according to any one of items 1 to 5, the liquid crystal layer is a vertical alignment type.

Item 7

The liquid crystal display device according to any one of items 1 to 5, the liquid crystal layer is a horizontal alignment type.

Item 8

The liquid crystal display device according to any one of items 1 to 7, the first substrate further includes a backplane circuit that drives the plurality of pixels. The interlayer insulating layer has a contact hole for electrically connecting the pixel electrode to the backplane circuit, in the transmissive region.

Item 9

The liquid crystal display device according to any one of items 1 to 8, the transmissive region of each pixel includes a plurality of sub transmissive regions separated from each other. The plurality of sub transmissive regions include a first sub transmissive region including a contact hole and a second sub transmissive region not including the contact hole.

Item 10

The liquid crystal display device according to item 9, each pixel includes a plurality of sub pixels. The plurality of sub pixels include a first sub pixel including the first sub transmissive region and a second sub pixel including the second sub transmissive region. The pixel electrode includes a plurality of sub pixel electrodes. The plurality of sub pixel electrodes include a first sub pixel electrode disposed in the first sub pixel and a second sub pixel electrode disposed in the second sub pixel. The first sub pixel electrode and the second sub pixel electrode are electrically connected to each other.

Item 11

The liquid crystal display device according to item 10, the pixel electrode further includes a connection electrode that connects the first sub pixel electrode and the second sub pixel electrode. The first sub pixel electrode, the second sub pixel electrode, and the connection electrode have a U-shape as a whole.

Item 12

The liquid crystal display device according to item 11, the plurality of sub transmissive regions further include a third sub transmissive region including the contact hole. The plurality of sub pixels further include a third sub pixel including the third sub transmissive region. The plurality of sub pixel electrodes further include a third sub pixel electrode disposed in the third sub pixel and located between the first sub pixel electrode and the second sub pixel electrode.

Item 13

The liquid crystal display device according to item 12, in a case in which the first sub pixel electrode, the second sub pixel electrode, and the connection electrode are referred to as a first electrode segment, the third sub pixel electrode is referred to as a second electrode segment, and an interval between the first electrode segment and the second electrode segment is referred to as a segment boundary, the segment boundary has a curved shape.

Item 14

The liquid crystal display device according to item 13, a portion, which defines the segment boundary, of an outer edge of the first electrode segment and a portion, which defines the segment boundary, of an outer edge of the second electrode segment each have an arc shape.

Item 15

The liquid crystal display device according to any one of items 1 to 14, the first substrate has an alignment film provided to be in contact with the liquid crystal layer.

Item 16

The liquid crystal display device according to any one of items 1 to 15, the plurality of pixels constitute a plurality of color display pixels. Each of the plurality of color display pixels includes three or more pixels displaying colors different from each other. A resolution is 180 ppi or more. A size of each color display pixel is 140 μm×140 μm or less. A size of the transmissive region is 30 μm×30 μm or less.

Item 17

The liquid crystal display device according to any one of items 1 to 16, a thickness of the liquid crystal layer in the reflective region is 2.0 μm or more and 2.5 μm or less. A thickness of the liquid crystal layer in the transmissive region is 3.0 μm or more and 3.8 μm or less.

Item 18

The liquid crystal display device according to any one of items 1 to 17, the plurality of pixels include a red pixel displaying red, a green pixel displaying green, and a blue pixel displaying blue. A thickness of the liquid crystal layer in the reflective region of the blue pixel is smaller than each of a thickness of the liquid crystal layer in the reflective region of the red pixel and a thickness of the liquid crystal layer in the reflective region of the green pixel.

Item 19

The liquid crystal display device according to item 18, the second substrate includes a color filter layer. The color filter layer includes a red color filter disposed in the red pixel, a green color filter disposed in the green pixel, and a blue color filter disposed in the blue pixel. A thickness of the blue color filter is larger than each of a thickness of the red color filter and a thickness of the green color filter.

According to an embodiment of the disclosure, provided is a transflective type liquid crystal display device in which the occurrence of display failure due to a nonuniform cell gap is suppressed.

DESCRIPTION OF THE EMBODIMENTS

Hereinafter, an embodiment of the present disclosure will be described with reference to drawings. The present disclosure is not limited to the embodiment described below.

Embodiment 1

Figure 1:
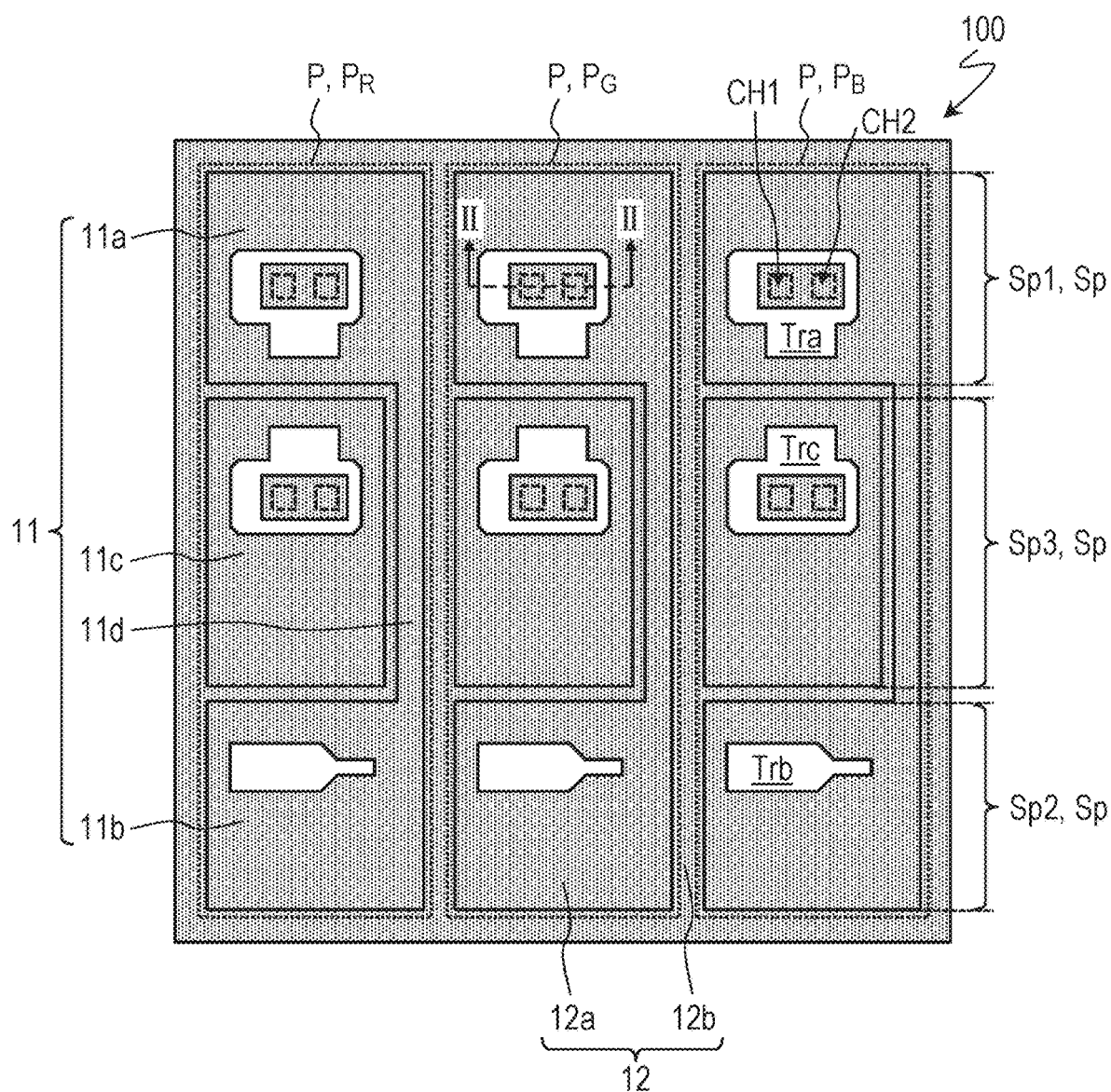
FIG. 1 is a plan view schematically showing a liquid crystal display device according to an embodiment of the present disclosure, and showing regions corresponding to three pixels of the liquid crystal display device.
Figure 2:
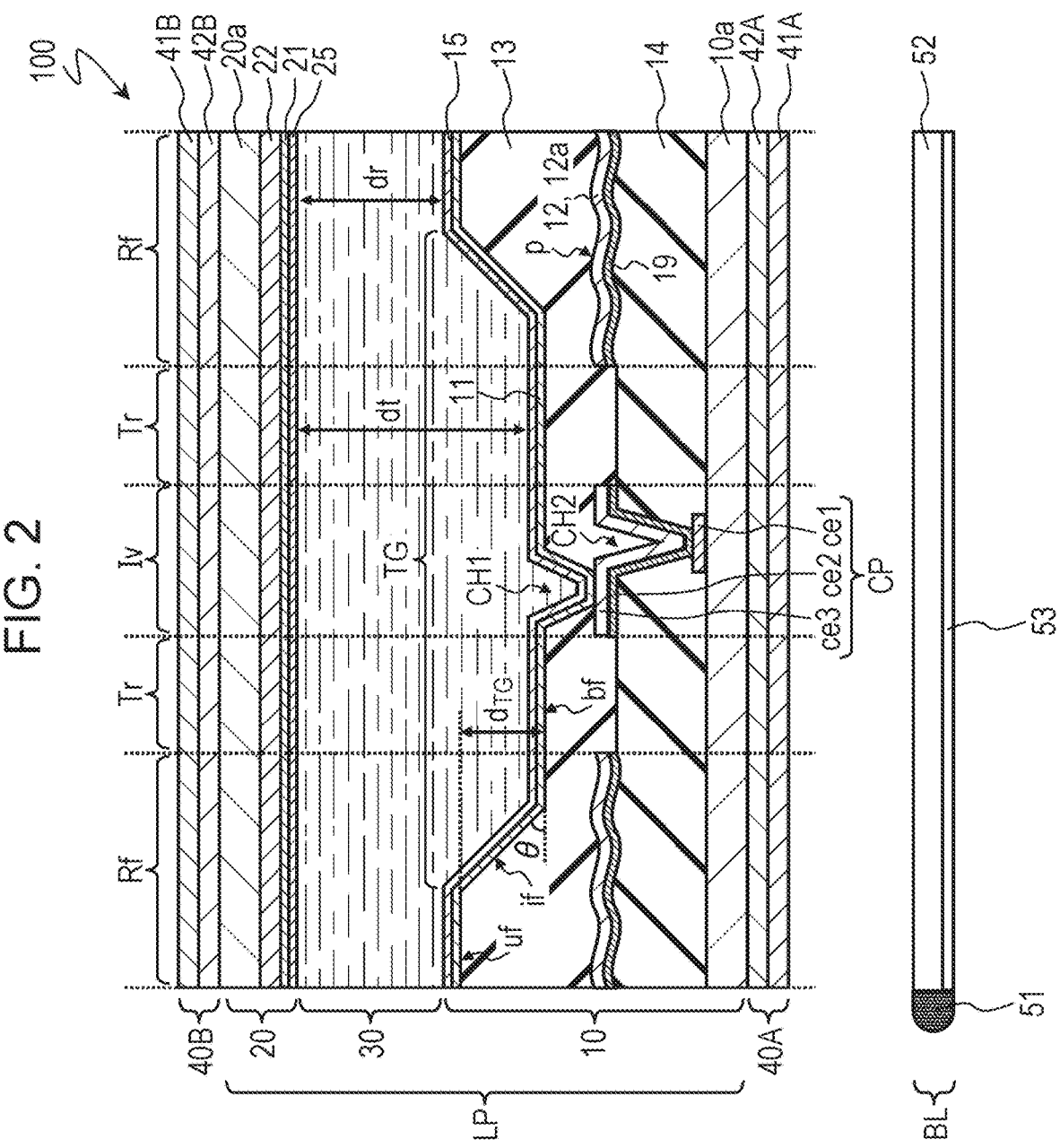
FIG. 2 is a cross-sectional view schematically showing the liquid crystal display device, and showing a cross-sectional structure taken along line II-II in FIG. 1.

A liquid crystal display device 100 according to the present embodiment will be described with reference to FIGS. 1 and 2. The liquid crystal display device 100 of the present embodiment is a transflective type (transmission/reflection combined type) liquid crystal display device. FIG. 1 is a plan view schematically showing the liquid crystal display device 100, and showing regions corresponding to three pixels P of the liquid crystal display device 100. FIG. 2 is a cross-sectional view schematically showing the liquid crystal display device 100, and showing a cross-sectional structure taken along line II-II in FIG. 1.

As shown in FIG. 1, the liquid crystal display device 100 has a plurality of pixels P. The plurality of pixels P are arranged in a matrix including a plurality of rows and a plurality of columns. Typically, the plurality of pixels P include a red pixel $P_R$ for displaying red, a green pixel $P_G$ for displaying green, and a blue pixel $P_B$ for displaying blue.

As shown in FIG. 2, the liquid crystal display device 100 includes a liquid crystal display panel LP and a backlight (illumination device) BL disposed on a back surface side of the liquid crystal display panel LP (side opposite to an observer side). The liquid crystal display panel LP includes a TFT substrate (first substrate) 10, a counter substrate (second substrate) 20 opposite to the TFT substrate 10, and a vertical alignment type liquid crystal layer 30 provided between the TFT substrate 10 and the counter substrate 20. Each pixel P includes a reflective region Rf for display in a reflective mode and a transmissive region Tr for display in a transmissive mode.

A thickness (transmissive cell gap) dt of the liquid crystal layer 30 in the transmissive region Tr and a thickness (reflective cell gap) dr of the liquid crystal layer 30 in the reflective region Rf are different from each other. Specifically, the transmissive cell gap dt is larger than the reflective cell gap dr (that is, dt>dr). In this way, the liquid crystal display device 100 has a multi-gap structure. The reflective cell gap dr is, for example, 2.0 μm or more and 2.5 μm or less, and the transmissive cell gap dt is, for example, 3.0 μm or more and 3.8 μm or less.

A ratio of an area of the transmissive region Tr occupied in the pixel P can be appropriately set according to the application or the like, and is, for example, 10% or more and 90% or less. In addition, a position or a shape of the transmissive region Tr in the pixel P can also be appropriately set according to the application or the like. In the specification of the present application, a region Iv that does not contribute to the reflective display and the transmissive display in the pixel P may be referred to as an "inactive region".

The TFT substrate 10 includes a pixel electrode 11 disposed in each pixel P and a reflective layer 12 located on a side of the pixel electrode 11 opposite to the liquid crystal layer 30 (that is, the back surface side with respect to the pixel electrode 11). The TFT substrate 10 further includes a first interlayer insulating layer 13, a second interlayer insulating layer 14, a contact portion CP, and a first alignment film 15.

The components (pixel electrode 11 and the like described above) of the TFT substrate 10 are supported by a transparent substrate 10a. As a material of the transparent substrate 10a, for example, non-alkali glass or plastic can be used.

A circuit (backplane circuit) (not shown) for driving the plurality of pixels P is formed on the transparent substrate 10a. The backplane circuit is not particularly limited. For example, the backplane circuit may include a memory circuit (for example, SRAM) connected to each of the plurality of pixels P. A liquid crystal display device in which the memory circuit is provided for each pixel P may be referred to as a "memory liquid crystal". A specific configuration of the memory liquid crystal is disclosed in, for example, Japanese Patent No. 5036864 (corresponding to the specification of U.S. Pat. No. 8,692,758). The entire contents disclosed in Japanese Patent No. 5036864 and the specification of U.S. Pat. No. 8,692,758 are incorporated in the present specification by reference. Alternatively, the backplane circuit may include a thin film transistor (TFT) connected to the pixel electrode 11, as in a general active matrix substrate. The TFT is, for example, a TFT (refer to Japanese Unexamined Patent Application Publication No. 2014-007399) having an oxide semiconductor layer including an amorphous silicon layer, a polysilicon layer, or an In—Ga—Zn—O-based semiconductor as an active layer. Japanese Unexamined Patent Application Publication No. 2014-007399 is incorporated in the present specification by reference. The backplane circuit can also include various wirings, such as a gate wiring and a source wiring, in addition to the memory circuit or the TFT.

The second interlayer insulating layer 14 is provided to cover the backplane circuit. The second interlayer insulating layer 14 is a transparent insulating layer and is, for example, formed of a transparent organic insulating material. A surface of the second interlayer insulating layer 14 has an uneven shape. In other words, the second interlayer insulating layer 14 has an uneven surface structure. The second interlayer insulating layer 14 having the uneven surface structure can be formed of, for example, a photosensitive resin as described in Japanese Patent No. 3394926.

The reflective layer 12 is provided on the second interlayer insulating layer 14. The reflective layer 12 is formed of a metal material having high reflectance. As the metal material for forming the reflective layer 12, for example, aluminum, silver, a silver alloy, or the like can be used.

A surface of the reflective layer 12 has an uneven shape on which the uneven surface structure of the second interlayer insulating layer 14 is reflected. In other words, the reflective layer 12 also has an uneven surface structure. The uneven surface structure of the reflective layer 12 may be referred to as a micro reflective structure (MRS), and is provided to spread and reflect surrounding light to realize display close to paper white. The uneven surface structure can be formed of, for example, a plurality of protrusion portions p non-periodically disposed such that a center interval between the adjacent protrusion portions p is 5 μm or more and 50 μm or less, preferably 10 μm or more and 20 μm or less. When viewed from a normal direction of a display surface, a shape of the protrusion portion p is substantially circular or substantially polygonal. An area of the protrusion portion p occupied in the pixel P is, for example, about 20% to 40%. A height of the protrusion portion p is, for example, 1 μm or more and 5 μm or less.

The reflective layer 12 includes a first portion 12a located in the reflective region Rf of each pixel P and a second portion 12b located between any two pixels P adjacent to each other. The uneven surface structure of the reflective layer 12 is formed in each of the first portion 12a and the second portion 12b. In other words, in addition to the first portion 12a, the second portion 12b also has an uneven surface structure.

The reflective layer 12 does not have to have the uneven surface structure (that is, may have a substantially flat surface). In a case in which the reflective layer 12 does not have the uneven surface structure, the display close to the paper white can be realized by using the reflective layer 12 and a light scattering layer in combination.

The first interlayer insulating layer 13 is provided to cover the reflective layer 12. The first interlayer insulating layer 13 is a transparent insulating layer and is, for example, formed of a transparent organic insulating material. A recess portion (transmissive aperture groove) TG for making the transmissive cell gap dt larger than the reflective cell gap dr is formed in the first interlayer insulating layer 13 by a photolithography process.

The pixel electrode 11 is provided on the first interlayer insulating layer 13. In other words, the pixel electrode 11 is provided on the reflective layer 12 via the first interlayer insulating layer 13. The pixel electrode 11 is formed of a transparent conductive material. As the transparent conductive material, for example, indium tin oxide (ITO), indium zinc oxide (IZO (registered trademark)), or a mixture of ITO and IZO can be used. The pixel electrode 11 is electrically connected to the backplane circuit.

The contact portion CP electrically connects the pixel electrode 11 and the backplane circuit in a first contact hole CH1 formed in the first interlayer insulating layer 13 and a second contact hole CH2 formed in the second interlayer insulating layer 14. The first contact hole CH1 and the second contact hole CH2 are formed by, for example, the photolithography process. The first interlayer insulating layer 13 has the first contact hole CH1 in the transmissive region Tr, and the second interlayer insulating layer 14 has the second contact hole CH2 in the transmissive region Tr. In the shown example, the contact portion CP is formed of a first contact electrode ce1, a second contact electrode ce2, and a third contact electrode ce3.

The first contact electrode ce1 is an electrode (or a part of a wiring) exposed in the second contact hole CH2. The first contact electrode ce1 is, for example, formed of the same conductive film (metal film such as aluminum or copper) as the source wiring of the backplane circuit.

The second contact electrode ce2 is a transparent contact electrode formed of a transparent conductive material (for example, indium tin oxide or indium zinc oxide). The second contact electrode ce2 includes a portion located in the second contact hole CH2, and is in contact with the first contact electrode ce1 in the second contact hole CH2.

The third contact electrode ce3 is a reflective contact electrode formed in the same layer as the reflective layer 12 (that is, formed of the same reflective film as the reflective layer 12) to be in contact with the second contact electrode (transparent contact electrode) ce2. The third contact electrode ce3 includes a portion that overlaps the first contact hole CH1. The pixel electrode 11 is in contact with the third contact electrode ce3 in the first contact hole CH1, and is electrically connected to the backplane circuit via the contact portion CP.

In a case in which the contact portion CP includes the reflective contact electrode ce3, the reflective contact electrode ce3 functions as a light shielding layer for the light from the backlight BL. Therefore, in a case in which an alignment defect occurs in the vicinity of the first contact hole CH1, it is possible to suppress adverse influence on a quality of the transmissive display due to the alignment defect.

In the shown example, since the contact portion CP includes the reflective contact electrode ce3, a region in which the contact portion CP is present is the inactive region IV, and the first contact hole CH1 and the second contact hole CH2 are strictly located in the inactive region IV, not the transmissive region Tr. However, in this case as well, since the contact portion CP is surrounded by the transmissive region Tr, in the specification of the present application, the first contact hole CH1 and the second contact hole CH2 may be expressed to be included in the transmissive region Tr in such a case.

In the shown example, a transparent conductive layer 19 formed of the same conductive film as the second contact electrode ce2 (that is, in the same layer as the second contact electrode ce2) is interposed between the reflective layer 12 and the second interlayer insulating layer 14. The transparent conductive layer 19 may be omitted.

The counter substrate 20 includes a counter electrode 21, a color filter layer 22, and a second alignment film 25. The counter substrate 20 further has a plurality of columnar spacers (not shown). The components (counter electrode 21 and the like described above) of the counter substrate 20 are supported by the transparent substrate 20a. As a material of the transparent substrate 20a, for example, non-alkali glass or plastic can be used. The counter substrate 20 does not include a black matrix (light shielding layer) between any two pixels P adjacent to each other.

The counter electrode 21 is provided to be opposite to the pixel electrode 11. The counter electrode 21 is formed of a transparent conductive material. As the transparent conductive material for forming the counter electrode 21, the same material as the material of the pixel electrode 11 can be used. For example, the same potential as the potential (common potential) applied to the counter electrode 21 is applied to the reflective layer 12.

Typically, the color filter layer 22 includes a red color filter disposed in the red pixel, a green color filter disposed in the green pixel, and a blue color filter disposed in the blue pixel. A region corresponding to between the pixels P of different colors on the color filter layer is substantially equally divided by, for example, color filters of different colors. An overcoat layer may be formed to cover the color filter layer 22.

The columnar spacer defines the thickness (cell gap) of the liquid crystal layer 30. The columnar spacer can be formed of a photosensitive resin.

The liquid crystal layer 30 includes a nematic liquid crystal material having a negative (that is, negative type) dielectric anisotropy and does not include a chiral agent. The liquid crystal layer 30 can be formed by, for example, a dropping method.

Each of the first alignment film 15 and the second alignment film 25 is provided to be in contact with the liquid crystal layer 30. Here, each of the first alignment film 15 and the second alignment film 25 is a vertical alignment film. In the present specification, the "vertical alignment film" need only be an alignment film that aligns the liquid crystal molecules in the vicinity of the alignment film substantially perpendicularly to the surface of the alignment film, and for example, can be an alignment film that adds a pretilt angle of 86.0° or more to the liquid crystal molecules. It is preferable that the main component of the vertical alignment film is, for example, polyimide, polyamic acid, polymaleimide, or polysiloxane. These components are a polymer group that can be effectively used as the alignment film.

At least one of the first alignment film 15 and the second alignment film 25 is subjected to alignment treatment, and defines a pretilt direction. As the alignment treatment, rubbing treatment or light alignment treatment can be used. The alignment film in which the strength or the direction of the alignment regulating force with respect to the liquid crystal molecules is changed by the light alignment treatment (light irradiation/exposure) is referred to as a "light alignment film". It is preferable that the light alignment film includes, as a photoreactive functional group, at least one of a cinnamate group, an azobenzene group, a chalcone group, a stilbene group, and a coumarin group. As a result, since the likelihood that the photodecomposition material is eluted into the liquid crystal layer 30 is reduced, the reliability can be improved, and the light alignment treatment can be performed with relatively low irradiation energy.

The liquid crystal molecules of the liquid crystal layer 30 are vertically aligned in a state in which no voltage is applied to the liquid crystal layer 30, and are horizontally aligned in a state in which a prescribed voltage is applied to the liquid crystal layer 30. In the present embodiment, a twist angle of the liquid crystal layer 30 is substantially 0°, and the display is performed in a vertical aligned electrically controlled birefringence (VA-ECB) mode. The phrase "twist angle is substantially 0°" also includes a case in which the twist angle is close to 0° within a range of a manufacturing error.

As the liquid crystal layer 30, a layer including a nematic liquid crystal material having a positive (that is, positive type) dielectric anisotropy may be used. In this case, a horizontal alignment film is used as the first alignment film 15 and the second alignment film 25, and the ECB mode is adopted as the display mode. In this way, the liquid crystal layer 30 may be a horizontal alignment type.

The liquid crystal display device 100 further includes a pair of circular polarizing plates 40A and 40B. One (first circular polarizing plate) 40A of the pair of circular polarizing plates 40A and 40B is disposed on the back surface side of the liquid crystal display panel LP, and the other (second circular polarizing plate) 40B is disposed on the observer side of the liquid crystal display panel LP. The first circular polarizing plate (back circular polarizing plate) 40A includes a first linear polarizing plate 41A and a first phase difference plate 42A located between the first linear polarizing plate 41A and the liquid crystal display panel LP. The second circular polarizing plate (front circular polarizing plate) 40B includes a second linear polarizing plate 41B and a second phase difference plate 42B located between the second linear polarizing plate 41B and the liquid crystal display panel LP.

The second linear polarizing plate (front linear polarizing plate) 41B is an absorptive linear polarizing plate. As the absorptive linear polarizing plate, a linear polarizing plate a dye-based polarizing plate, an application type polarizing plate, or the like formed of a film polarizer obtained by dyeing and extending polyvinyl alcohol (PVA) and a triacetyl cellulose (TAC) protective layer can be used. The absorptive linear polarizing plate has a transmission axis and an absorption axis orthogonal to the transmission axis.

As in the first linear polarizing plate (back linear polarizing plate) 41A, an absorptive linear polarizing plate can be used as in the front linear polarizing plate 41B. Also, a reflective linear polarizing plate, or a laminate of the absorptive linear polarizing plate and the reflective linear polarizing plate may be used. Examples of the reflective linear polarizing plate include a multilayer reflective polarizing plate (trade name: DBEF) manufactured by 3M, and a combination of a cholesteric LC film and a λ/4 plate. Unlike the absorptive linear polarizing plate, the reflective linear polarizing plate has a reflection axis in a direction orthogonal to the transmission axis. Therefore, a part of the light from the backlight BL is recycled by being reflected by the reflective linear polarizing plate and further reflected by a reflector 53 included in the backlight BL. The reflective linear polarizing plate may be included in the backlight BL, not the back linear polarizing plate 41A.

Each of the first phase difference plate 42A and the second phase difference plate 42B may be one λ/4 plate, or may be a combination of one λ/4 plate and one or two λ/2 plates or a combination of one λ/4 plate and one negative C plate.

The directions of the absorption axes of the back linear polarizing plate 41A and the front linear polarizing plate 41B or the directions of the slow axes of the first phase difference plate 42A and the second phase difference plate 42B are set such that the display is performed in a normally black mode. The liquid crystal molecules of the liquid crystal layer 30 are vertically aligned in a black display state, and fall with the twist angle of 0° in a white display state (and a gray level display state).

The backlight BL is disposed on the back surface side of the back circular polarizing plate 40A. The backlight BL includes a light source (for example, an LED) 51 that emits light, a light guide plate 52 that guides the light from the light source 51 to the liquid crystal panel side, and the reflector 53 disposed on the back surface side of the light guide plate 52. The backlight BL may further include a prism sheet and a diffuser sheet disposed on the front surface side (or the back surface side) of the light guide plate 52.

The shown liquid crystal display device 100 has a configuration for performing the gray scale display with a memory liquid crystal. Specifically, as shown in FIG. 1, each pixel P of the liquid crystal display device 100 includes a plurality of sub pixels Sp. FIG. 1 shows an example in which one pixel P is divided into three sub pixels Sp. Hereinafter, among the three sub pixels Sp, a sub pixel Sp1 disposed on the upper side in the drawing is referred to as a "first sub pixel", and a sub pixel Sp2 disposed on the lower side in the drawing is referred to as a "second sub pixel". A sub pixel Sp3 disposed at the center in the drawing is referred to as a "third sub pixel".

The transmissive region Tr of each pixel P includes a plurality of sub transmissive regions Tra, Trb, and Trc separated from each other. The plurality of sub transmissive regions Tra, Trb, and Trc include a first sub transmissive region Tra included in the first sub pixel Sp1, a second sub transmissive region Trb included in the second sub pixel Sp2, and a third sub transmissive region Trc included in the third sub pixel Sp3.

Each of the first sub transmissive region Tra and the third sub transmissive region Trc includes the first contact hole CH1 and the second contact hole CH2. On the other hand, the second sub transmissive region Trb does not include the first contact hole CH1 and the second contact hole CH2.

The pixel electrode 11 includes a plurality of sub pixel electrodes 11a, 11b, and 11c. The plurality of sub pixel electrodes 11a, 11b, and 11c include a first sub pixel electrode 11a disposed in the first sub pixel Sp1, a second sub pixel electrode 11b disposed in the second sub pixel Sp2, and a third sub pixel electrode 11c disposed in the third sub pixel Sp3.

The first sub pixel electrode 11a disposed on the upper side in the drawing and the second sub pixel electrode 11b disposed on the lower side in the drawing are electrically connected to each other. In the shown example, the pixel electrode 11 further includes a connection electrode 11d, and the first sub pixel electrode 11a and the second sub pixel electrode 11b are connected to each other via the connection electrode 11d.

The first sub pixel electrode 11a, the second sub pixel electrode 11b, and the connection electrode 11d are integrally formed, and have a U-shape (inverted C-shape) as a whole. The third sub pixel electrode 11c is located between the first sub pixel electrode 11a and the second sub pixel electrode 11b. In a case in which the first sub pixel electrode 11a, the second sub pixel electrode 11b, and the connection electrode 11d are collectively referred to as a "first electrode segment", and the third sub pixel electrode 11c is referred to as a "second electrode segment", an area ratio of the first electrode segment and the second electrode segment is, for example, about 2:1.

The first sub pixel electrode 11a and the second sub pixel electrode 11b are electrically connected to one common memory circuit via the first contact hole CH1 and the second contact hole CH2 included in the first sub transmissive region Tra. The third sub pixel electrode 11c is electrically connected to another memory circuit via the first contact hole CH1 and the second contact hole CH2 included in the third sub transmissive region Trc. In other words, two memory circuits are provided for each pixel P.

Figure 3:
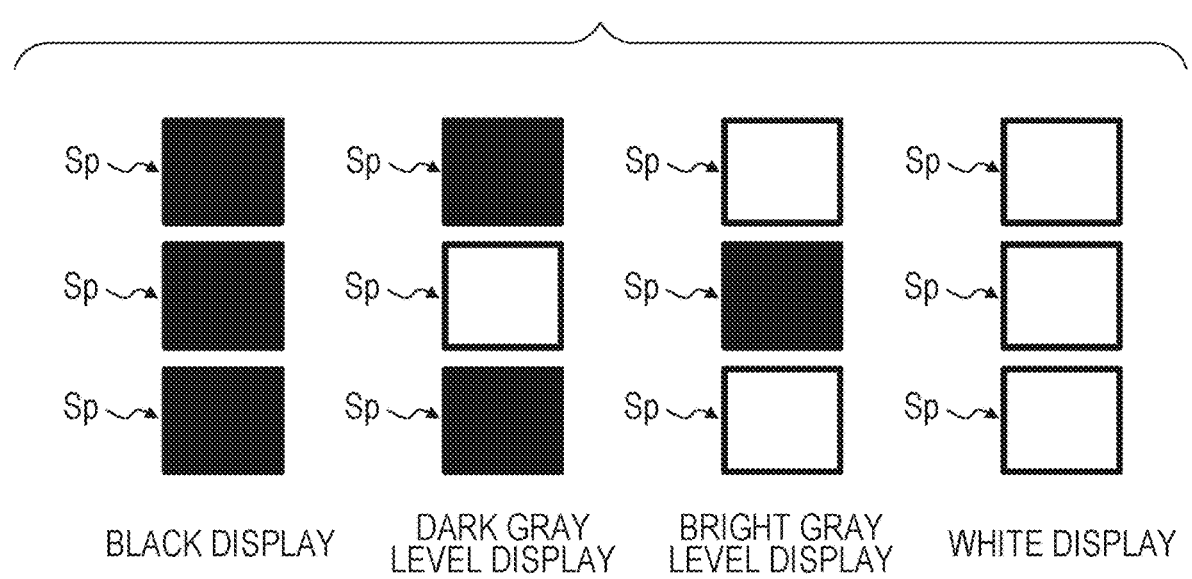
FIG. 3 is a diagram showing an example of gray scale display using the configuration shown in FIG. 1.

Since the pixel P is divided as shown in FIG. 1, four-gray scale display according to an area gray scale method can be performed, as shown in FIG. 3. Specifically, the black display can be performed on one pixel P as a whole by setting all the three sub pixels Sp in the black display state as shown on the leftmost side of FIG. 3, and dark gray level display can be performed on one pixel P as a whole by setting two sub pixels Sp in the black display state and setting one sub pixel Sp in the white display state as shown on the second from the left side of FIG. 3. In addition, bright gray level display can be performed on one pixel P as a whole by setting two sub pixels Sp in the white display state and setting one sub pixel Sp in the black display state as shown on the third from the left side of FIG. 3, and the white display can be performed on one pixel P as a whole by setting all the three sub pixels Sp in the white display state as shown on the rightmost side of FIG. 3.

The three sub pixel electrodes 11a, 11b, and 11c may be electrically connected to different memory circuits (that is, three memory circuits may be provided in each pixel P), respectively.

As described above, the first interlayer insulating layer 13 has the recess portion (transmissive aperture groove) TG. Hereinafter, the recess portion TG will be described in more detail.

As shown in FIG. 2, the recess portion TG is defined by a bottom surface bf and an inclined side surface if. In a case in which a portion uf in which the recess portion TG is not formed, on the surface of the first interlayer insulating layer 13 on the liquid crystal layer 30 side is referred to as an "upper surface", the inclined side surface if is a portion connecting the upper surface uf and the bottom surface bf. The inclined side surface if is inclined with respect to a substrate surface of the transparent substrate 10a.

At least a part of the recess portion TG is located in the transmissive region Tr. The first contact hole CH1 is formed to overlap a part of the recess portion TG. A depth $d_{TG}$ (difference in height between the upper surface uf and the bottom surface bf) of the recess portion TG is 0.5 μm or more. An inclination angle θ of the inclined side surface if of the recess portion TG is 25° or less.

As described above, the liquid crystal display device 100 of the present embodiment has a two-stage electrode structure in which the reflective layer (reflective electrode) 12 and the pixel electrode 11 are separated from each other via the first interlayer insulating layer 13. Therefore, the reflective layer 12 can include the second portion 12b located between two adjacent pixels P, in addition to the first portion 12a located inside the pixel P. Therefore, since the region between the pixels P can also contribute to the reflective display, a reflective aperture ratio (ratio of the region contributing to the display in the reflective mode in the display region) is improved, and the reflectance can be further improved. Therefore, it is possible to perform brighter display in the reflective mode. Further, since the uneven surface structure of the reflective layer 12 is flattened by the first interlayer insulating layer 13 formed below the pixel electrode 11, alignment disorder due to the uneven surface structure of the reflective layer 12 does not occur, and the alignment with high in-plane uniformity can be obtained.

In the liquid crystal display device 100 of the present embodiment, since the region between the pixels P contributes to the display in the reflective mode, it is preferable that the counter substrate 20 does not include the black matrix between any two pixels P adjacent to each other among the plurality of pixels P.

In the liquid crystal display device 100 of the present embodiment, the first interlayer insulating layer 13 has the recess portion TG, and thus a multi-gap structure (structure in which the transmissive cell gap dt is larger than the reflective cell gap dr) is realized. The light used for the display in the transmissive mode passes through the liquid crystal layer 30 only once, whereas the light used for the display in the reflective mode passes through the liquid crystal layer 30 twice. Therefore, as in the present embodiment, since the cell gap dt of the transmissive region Tr is made larger than the cell gap dr of the reflective region Rf, the retardation of the liquid crystal layer 30 for the light used for the display in the transmissive mode can be increased, and voltage-brightness performance that is preferable (can realize brighter display) for the transmissive region Tr can be obtained.

According to the study by the inventors of the present application, in the transflective type LCD having the multi-gap structure, it is understood that the cell gap is different for each pixel, and the display failure may occur due to the cell gap. Further, it is also understood that a cause of the nonuniform cell gap is that, in a case in which the alignment film material for forming the first alignment film 15 is applied, an application thickness is different for each pixel due to the shape, the size, or the like of the recess portion TG of the first interlayer insulating layer 13, and the film thickness of the first alignment film 15 is nonuniform due to the fact. On the other hand, in the liquid crystal display device 100 of the present embodiment, the inclination angle θ of the inclined side surface if of the recess portion TG is 25° or less, and the occurrence of the above-described display failure is suppressed as described below with reference to the results of the verification. From the viewpoint of ensuring the transmissive mode efficiency desired for the appearance, the depth $d_{TG}$ of the recess portion TG is preferably 0.5 μm or more.

Specifically, the verification was performed as described below.

First, a liquid crystal display panel ("panel #1") in which the inclination angle of the inclined side surface of the recess portion is relatively large and a liquid crystal display panel ("panel #2") in which the inclination angle of the inclined side surface of the recess portion is relatively small were experimentally manufactured. In a case in which a visual inspection was performed on the panels #1 and #2, the unevenness was visually recognized in the panel #1, whereas the unevenness was not visually recognized in the panel #2.

For the TFT substrate of the panel #1, cross-sectional SEM images of two pixels (pixel 1A and pixel 1B) having different display states were acquired. Further, for the TFT substrate of panel #2, cross-sectional SEM images of any two pixels (pixel 2A and pixel 2B) were acquired. Then, the inclination angle of the inclined side surface of the recess portion, the depth of the recess portion, the thickness of the first alignment film, and the transmissive cell gap were calculated from these SEM images, and a difference in the transmissive mode efficiency between the two pixels (pixel 1A and pixel 1B in the panel #1, pixel 2A and pixel 2B in the panel #2) on the same panel was further calculated. Table 1 shows the results of the calculation.

TABLE 1

| | | Inclination angle of inclined side surface | Depth of recess portion | Thickness of alignment film | Transmissive cell gap | Transmissive mode efficiency | Difference in transmissive mode efficiency |
|---|---|---|---|---|---|---|---|
| Panel #1 (with unevenness) | Pixel 1A | 26° | 2.03 μm | 0.64 μm | 3.4 μm | 26.3% | 3.1% |
| | Pixel 1B | | | 0.17 μm | 3.9 μm | 29.4% | |
| Panel #2 (without unevenness) | Pixel 2A | 18° | 1.59 μm | 0.44 μm | 3.2 μm | 23.8% | 0.5% |
| | Pixel 2B | | | 0.36 μm | 3.2 μm | 24.3% | |

As understood from Table 1, in the panel #1, the depth of the recess portion was 2.03 μm, and the inclination angle of the inclined side surface was 26°. On the other hand, in the panel #2, the depth of the recess portion was 1.59 μm, and the inclination angle of the inclined side surface was 18°. The difference in the transmissive mode efficiency was 3.1% in the panel #1 but 0.5% in the panel #2. Since the recess portion is deeper and the transmissive cell gap is larger in the panel #1 than in the panel #2, the transmissive mode efficiency itself is higher in the panel #1. However, it is presumed that, in the panel #1, the inclination angle of the inclined side surface is large due to the deep recess portion, and thus the thickness of the alignment film is nonuniform.

Figure 4:
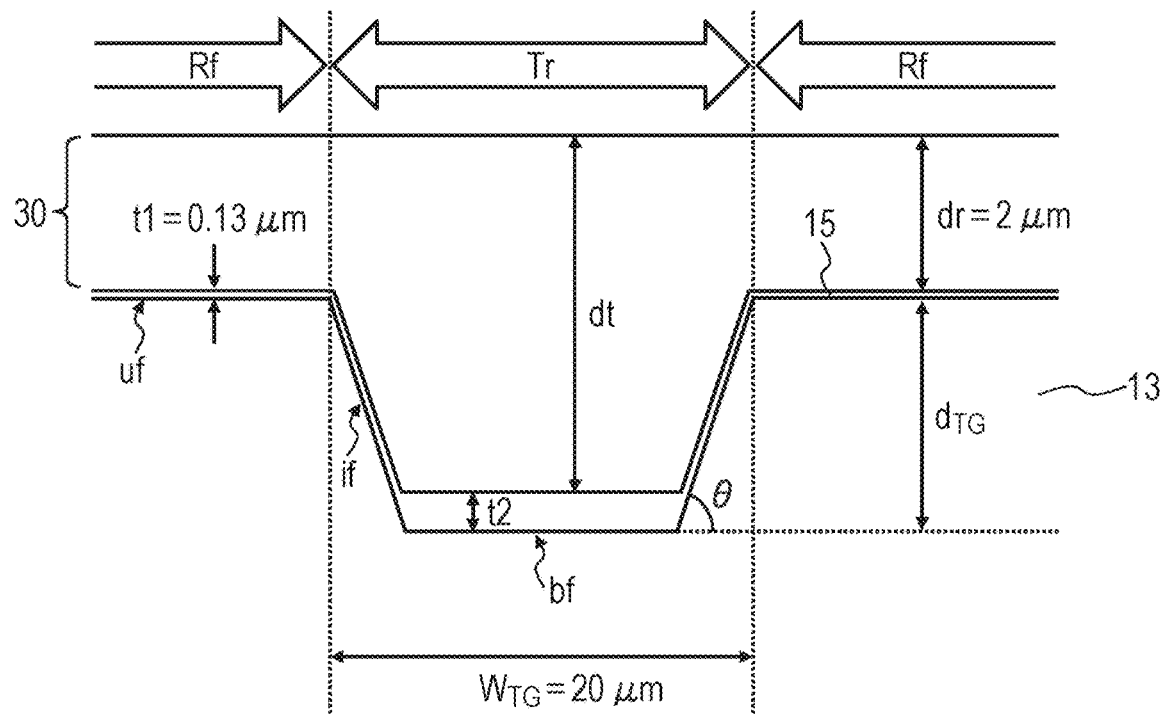
FIG. 4 is a diagram showing conditions during calculation by a simulation.
Figure 5:
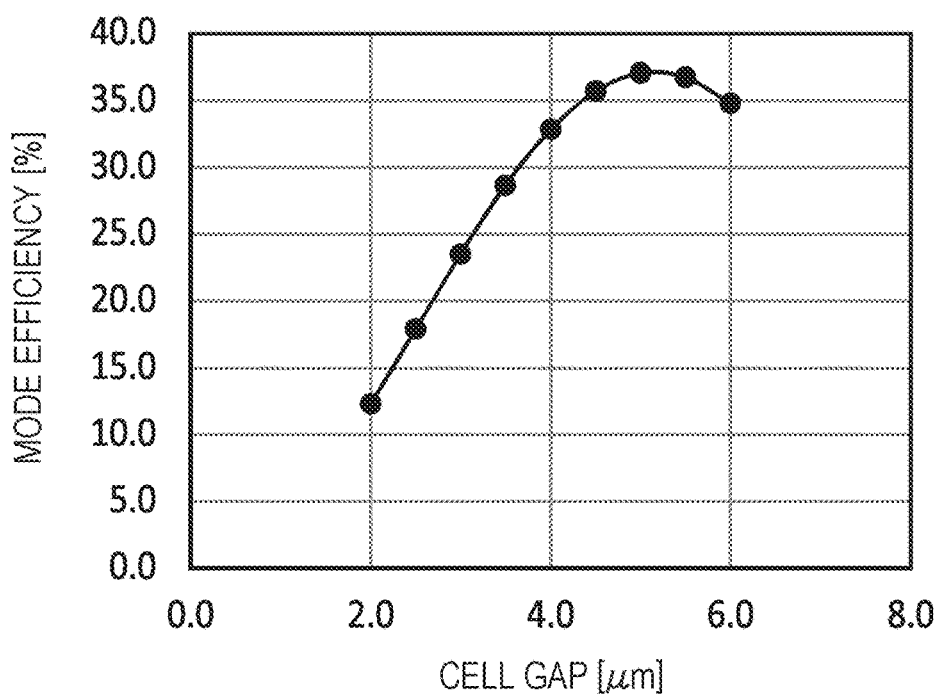
FIG. 5 is a graph showing a relationship between a cell gap and mode efficiency.

Based on the results shown in Table 1, in a range of the inclination angle of 4° to 30°, for the two pixels A and B, the bias of the thickness of the first alignment film (thickness on the bottom surface of the recess portion) and the transmissive cell gap determined according to the bias were calculated by a simulation. In the calculation, as shown in FIG. 4, the reflective cell gap dr was set to 2 μm, a width $W_{TG}$ of the recess portion TG was set to 20 μm, and a thickness t1 of the first alignment film 15 on the upper surface uf and the inclined side surface if was set to 0.13 μm, the depth $d_{TG}$ of the recess portion TG, and then a thickness t2 of the first alignment film 15 on the bottom surface bf, and the transmissive cell gap dt were calculated. Further, the transmissive mode efficiency was calculated by a simulation based on the measurement data for the experimentally manufactured panels A and B and the calculation data of the alignment simulation software (LCD Master manufactured by SHIN-TECH Co., Ltd.) (relationship between the cell gap and the mode efficiency shown in FIG. 5). Tables 2 to 5 show the results of the calculation.

TABLE 2

| Inclination angle [°] | Depth of recess portion [μm] | Reflective cell gap [μm] | Thickness of alignment film [μm] | | Transmissive cell gap [μm] | | Average transmissive cell gap [μm] | |
|---|---|---|---|---|---|---|---|---|
| | | | Pixel A | Pixel B | Pixel A | Pixel B | Pixel A | Pixel B |
| 4 | 0.47 | 2 | 0.40 | 0.41 | 2.08 | 2.07 | 2.07 | 2.06 |
| 5 | 0.59 | | 0.39 | 0.41 | 2.20 | 2.18 | 2.16 | 2.15 |
| 6 | 0.71 | | 0.39 | 0.41 | 2.32 | 2.30 | 2.25 | 2.24 |
| 7 | 0.83 | | 0.39 | 0.41 | 2.44 | 2.42 | 2.34 | 2.33 |
| 8 | 0.95 | | 0.39 | 0.41 | 2.56 | 2.54 | 2.42 | 2.41 |
| 9 | 1.01 | | 0.39 | 0.41 | 2.62 | 2.60 | 2.48 | 2.46 |
| 10 | 1.07 | | 0.38 | 0.42 | 2.69 | 2.66 | 2.53 | 2.51 |
| 11 | 1.14 | | 0.38 | 0.42 | 2.76 | 2.72 | 2.59 | 2.56 |
| 12 | 1.20 | | 0.38 | 0.42 | 2.83 | 2.78 | 2.64 | 2.61 |
| 13 | 1.27 | | 0.38 | 0.43 | 2.89 | 2.84 | 2.70 | 2.67 |
| 14 | 1.33 | | 0.37 | 0.43 | 2.96 | 2.91 | 2.75 | 2.72 |
| 15 | 1.40 | | 0.37 | 0.43 | 3.03 | 2.97 | 2.81 | 2.77 |
| 16 | 1.46 | | 0.37 | 0.43 | 3.10 | 3.03 | 2.86 | 2.82 |
| 17 | 1.53 | | 0.36 | 0.44 | 3.17 | 3.09 | 2.92 | 2.87 |

TABLE 3

| Inclination angle [°] | Depth of recess portion [μm] | Reflective cell gap [μm] | Thickness of alignment film [μm] | | Transmissive cell gap [μm] | | Average transmissive cell gap [μm] | |
|---|---|---|---|---|---|---|---|---|
| | | | Pixel A | Pixel B | Pixel A | Pixel B | Pixel A | Pixel B |
| 18 | 1.59 | 2 | 0.36 | 0.44 | 3.23 | 3.15 | 2.97 | 2.93 |
| 19 | 1.65 | | 0.34 | 0.46 | 3.31 | 3.18 | 3.04 | 2.96 |
| 20 | 1.70 | | 0.31 | 0.49 | 3.39 | 3.21 | 3.10 | 2.99 |
| 21 | 1.76 | | 0.29 | 0.51 | 3.47 | 3.24 | 3.16 | 3.02 |
| 22 | 1.81 | | 0.26 | 0.54 | 3.55 | 3.27 | 3.23 | 3.05 |
| 23 | 1.86 | | 0.24 | 0.56 | 3.63 | 3.30 | 3.29 | 3.08 |
| 24 | 1.92 | | 0.21 | 0.59 | 3.70 | 3.33 | 3.35 | 3.11 |
| 25 | 1.97 | | 0.19 | 0.61 | 3.78 | 3.36 | 3.42 | 3.14 |

TABLE 3-continued

| Inclination angle [°] | Depth of recess portion [μm] | Reflective cell gap [μm] | Thickness of alignment film [μm] | | Transmissive cell gap [μm] | | Average transmissive cell gap [μm] | |
|---|---|---|---|---|---|---|---|---|
| | | | Pixel A | Pixel B | Pixel A | Pixel B | Pixel A | Pixel B |
| 26 | 2.03 | | 0.17 | 0.64 | 3.86 | 3.39 | 3.48 | 3.17 |
| 27 | 2.08 | | 0.14 | 0.66 | 3.94 | 3.42 | 3.55 | 3.21 |
| 28 | 2.14 | | 0.12 | 0.68 | 4.02 | 3.45 | 3.61 | 3.24 |
| 29 | 2.19 | | 0.09 | 0.71 | 4.10 | 3.48 | 3.68 | 3.27 |
| 30 | 2.24 | | 0.07 | 0.73 | 4.18 | 3.51 | 3.74 | 3.30 |

TABLE 4

| Inclination angle [°] | Transmissive mode efficiency [%] | | Difference in transmissive mode efficiency [%] | Display quality |
|---|---|---|---|---|
| | Pixel A | Pixel B | | |
| 4 | 13.06 | 12.97 | 0.09 | — |
| 5 | 14.10 | 14.01 | 0.10 | A |
| 6 | 15.09 | 14.99 | 0.11 | A |
| 7 | 16.05 | 15.94 | 0.12 | A |
| 8 | 16.99 | 16.87 | 0.13 | A |
| 9 | 17.60 | 17.44 | 0.17 | A |
| 10 | 18.22 | 18.01 | 0.21 | A |
| 11 | 18.84 | 18.59 | 0.25 | A |
| 12 | 19.46 | 19.17 | 0.29 | A |
| 13 | 20.08 | 19.75 | 0.33 | A |
| 14 | 20.70 | 20.33 | 0.38 | A |
| 15 | 21.33 | 20.91 | 0.42 | A |
| 16 | 21.95 | 21.49 | 0.46 | A |
| 17 | 22.58 | 22.07 | 0.51 | A |

TABLE 5

| Inclination angle [°] | Transmissive mode efficiency [%] | | Difference in transmissive mode efficiency [%] | Display quality |
|---|---|---|---|---|
| | Pixel A | Pixel B | | |
| 18 | 23.21 | 22.66 | 0.55 | A |
| 19 | 23.88 | 23.02 | 0.86 | A |
| 20 | 24.52 | 23.37 | 1.15 | A |
| 21 | 25.17 | 23.71 | 1.47 | A |
| 22 | 25.82 | 24.03 | 1.80 | A |
| 23 | 26.48 | 24.35 | 2.13 | B |
| 24 | 27.13 | 24.66 | 2.47 | B |
| 25 | 27.79 | 24.98 | 2.81 | B |
| 26 | 28.45 | 25.30 | 3.16 | C |
| 27 | 29.03 | 25.61 | 3.42 | C |
| 28 | 29.58 | 25.92 | 3.65 | C |
| 29 | 30.12 | 26.24 | 3.89 | C |
| 30 | 30.68 | 26.55 | 4.12 | C |

An "average transmitting cell gap" shown in Tables 2 and 3 is a value obtained by averaging the thickness of the liquid crystal layer 30 in the transmissive region Tr including the thickness of the region corresponding to the inclined side surface if of the recess portion TG. Further, Tables 4 and 5 also show the difference in the transmissive mode efficiency between the two pixels A and B and a display quality determined according to the difference. The display quality is very good ("A") in a case in which the difference in the transmissive mode efficiency is 2.0% or less, good ("B") in a case in which the difference in the transmissive mode efficiency is more than 2.0% and 3.0% or less, and not good ("C") in a case in which the difference in the transmissive mode efficiency is more than 3.0%.

From Tables 2 to 5, it is understood that, as the inclination angle θ is smaller, the bias of the thickness of the first alignment film 15 is smaller, and the display quality tends to be improved. Also, it is understood that the inclination angle θ is preferably 25° or less, and more preferably 22° or less from the viewpoint of display quality. As described above, from the viewpoint of ensuring the transmissive mode efficiency desired for the appearance, the depth $d_{TG}$ of the recess portion TG is preferably 0.5 μm or more.

Subsequently, based on the results shown in Tables 2 to 5, the transmissive mode efficiency in a case in which the transmissive cell gap dt was increased to the technical limit while the inclination angle θ was fixed was calculated by a simulation. During the calculation, the thickness of the first alignment film 15 (thickness t2 on the bottom surface bf) was assumed to be completely dependent on the inclination angle θ of the inclined side surface if. Tables 6 to 9 show the results of the calculation.

TABLE 6

| Inclination angle [°] | Change in depth of recess portion [μm] | | Thickness of alignment film [μm] | | Transmissive cell gap [μm] | | Average transmissive cell gap [μm] | |
|---|---|---|---|---|---|---|---|---|
| | Before change | After change | Pixel A | Pixel B | Pixel A | Pixel B | Pixel A | Pixel B |
| 4 | 0.47 | 0.70 | 0.40 | 0.41 | 2.30 | 2.29 | 2.21 | 2.20 |
| 5 | 0.59 | 0.87 | 0.39 | 0.41 | 2.48 | 2.46 | 2.31 | 2.31 |
| 6 | 0.71 | 1.05 | 0.39 | 0.41 | 2.65 | 2.64 | 2.41 | 2.41 |
| 7 | 0.83 | 1.22 | 0.39 | 0.41 | 2.83 | 2.81 | 2.51 | 2.50 |
| 8 | 0.95 | 1.40 | 0.39 | 0.41 | 3.01 | 2.99 | 2.60 | 2.60 |
| 9 | 1.01 | 1.58 | 0.39 | 0.41 | 3.19 | 3.16 | 2.69 | 2.69 |
| 10 | 1.07 | 1.75 | 0.38 | 0.42 | 3.37 | 3.34 | 2.79 | 2.78 |
| 11 | 1.14 | 1.93 | 0.38 | 0.42 | 3.55 | 3.52 | 2.88 | 2.87 |
| 12 | 1.20 | 2.11 | 0.38 | 0.42 | 3.74 | 3.69 | 2.97 | 2.97 |

TABLE 6-continued

| Inclination angle [°] | Change in depth of recess portion [µm] Before change | Change in depth of recess portion [µm] After change | Thickness of alignment film [µm] Pixel A | Thickness of alignment film [µm] Pixel B | Transmissive cell gap [µm] Pixel A | Transmissive cell gap [µm] Pixel B | Average transmissive cell gap [µm] Pixel A | Average transmissive cell gap [µm] Pixel B |
|---|---|---|---|---|---|---|---|---|
| 13 | 1.27 | 2.30 | 0.38 | 0.43 | 3.92 | 3.87 | 3.07 | 3.06 |
| 14 | 1.33 | 2.48 | 0.37 | 0.43 | 4.11 | 4.05 | 3.16 | 3.15 |
| 15 | 1.40 | 2.67 | 0.37 | 0.43 | 4.30 | 4.24 | 3.26 | 3.25 |
| 16 | 1.46 | 2.85 | 0.37 | 0.43 | 4.49 | 4.42 | 3.35 | 3.34 |
| 17 | 1.53 | 3.04 | 0.36 | 0.44 | 4.68 | 4.61 | 3.45 | 3.44 |

TABLE 7

| Inclination angle [°] | Change in depth of recess portion [µm] Before change | Change in depth of recess portion [µm] After change | Thickness of alignment film [µm] Pixel A | Thickness of alignment film [µm] Pixel B | Transmissive cell gap [µm] Pixel A | Transmissive cell gap [µm] Pixel B | Average transmissive cell gap [µm] Pixel A | Average transmissive cell gap [µm] Pixel B |
|---|---|---|---|---|---|---|---|---|
| 18 | 1.59 | 3.23 | 0.36 | 0.44 | 4.87 | 4.79 | 3.55 | 3.54 |
| 19 | 1.65 | 3.43 | 0.34 | 0.46 | 5.09 | 4.96 | 3.65 | 3.63 |
| 20 | 1.70 | 3.62 | 0.31 | 0.49 | 5.31 | 5.13 | 3.75 | 3.73 |
| 21 | 1.76 | 3.82 | 0.29 | 0.51 | 5.53 | 5.31 | 3.85 | 3.83 |
| 22 | 1.81 | 4.02 | 0.26 | 0.54 | 5.76 | 5.48 | 3.95 | 3.93 |
| 23 | 1.86 | 4.22 | 0.24 | 0.56 | 5.99 | 5.66 | 4.05 | 4.03 |
| 24 | 1.92 | 4.43 | 0.21 | 0.59 | 6.22 | 5.84 | 4.16 | 4.13 |
| 25 | 1.97 | 4.64 | 0.19 | 0.61 | 6.45 | 6.03 | 4.26 | 4.23 |
| 26 | 2.03 | 4.85 | 0.17 | 0.64 | 6.69 | 6.22 | 4.37 | 4.34 |
| 27 | 2.08 | 5.07 | 0.14 | 0.66 | 6.93 | 6.41 | 4.48 | 4.45 |
| 28 | 2.14 | 5.29 | 0.12 | 0.68 | 7.17 | 6.61 | 4.59 | 4.55 |
| 29 | 2.19 | 5.52 | 0.09 | 0.71 | 7.42 | 6.81 | 4.71 | 4.67 |
| 30 | 2.24 | 5.74 | 0.07 | 0.73 | 7.68 | 7.01 | 4.82 | 4.78 |

TABLE 8

| Inclination angle [°] | Transmissive mode efficiency [%] Pixel A | Transmissive mode efficiency [%] Pixel B | Change in transmissive mode efficiency (average of pixels A and B) Before change | Change in transmissive mode efficiency (average of pixels A and B) After change | Increase value of mode efficiency |
|---|---|---|---|---|---|
| 4 | 14.64 | 14.58 | 13.01 | 14.61 | 1.60 |
| 5 | 15.79 | 15.73 | 14.06 | 15.76 | 1.70 |
| 6 | 16.88 | 16.83 | 15.04 | 16.85 | 1.81 |
| 7 | 17.95 | 17.89 | 15.99 | 17.92 | 1.92 |
| 8 | 19.00 | 18.95 | 16.93 | 18.98 | 2.05 |
| 9 | 20.06 | 20.00 | 17.52 | 20.03 | 2.51 |
| 10 | 21.11 | 21.04 | 18.12 | 21.07 | 2.96 |
| 11 | 22.16 | 22.08 | 18.71 | 22.12 | 3.40 |
| 12 | 23.21 | 23.12 | 19.31 | 23.16 | 3.85 |
| 13 | 24.19 | 24.12 | 19.91 | 24.16 | 4.24 |
| 14 | 25.16 | 25.08 | 20.51 | 25.12 | 4.61 |
| 15 | 26.14 | 26.05 | 21.12 | 26.10 | 4.98 |
| 16 | 27.12 | 27.03 | 21.72 | 27.08 | 5.36 |
| 17 | 28.11 | 28.02 | 22.33 | 28.06 | 5.74 |

TABLE 9

| Inclination angle [°] | Transmissive mode efficiency [%] Pixel A | Transmissive mode efficiency [%] Pixel B | Change in transmissive mode efficiency (average of pixels A and B) Before change | Change in transmissive mode efficiency (average of pixels A and B) After change | Increase value of mode efficiency |
|---|---|---|---|---|---|
| 18 | 29.02 | 28.95 | 22.93 | 28.98 | 6.05 |
| 19 | 29.86 | 29.75 | 23.45 | 29.81 | 6.36 |
| 20 | 30.71 | 30.56 | 23.95 | 30.63 | 6.69 |
| 21 | 31.56 | 31.39 | 24.44 | 31.47 | 7.03 |
| 22 | 32.42 | 32.22 | 24.93 | 32.32 | 7.40 |
| 23 | 33.15 | 33.00 | 25.41 | 33.08 | 7.66 |
| 24 | 33.76 | 33.59 | 25.90 | 33.67 | 7.77 |
| 25 | 34.37 | 34.19 | 26.39 | 34.28 | 7.89 |
| 26 | 35.00 | 34.80 | 26.87 | 34.90 | 8.02 |
| 27 | 35.63 | 35.42 | 27.32 | 35.52 | 8.20 |
| 28 | 35.98 | 35.88 | 27.75 | 35.93 | 8.18 |
| 29 | 36.28 | 36.18 | 28.18 | 36.23 | 8.05 |
| 30 | 36.59 | 36.48 | 28.61 | 36.53 | 7.92 |

From Tables 6 to 9, it is understood that the transmissive mode efficiency is improved by increasing the transmissive cell gap dt.

Subsequently, based on the results shown in Tables 2 to 5, the transmissive mode efficiency in a case in which the inclination angle θ was decreased to the limit while the depth $d_{TG}$ of the recess portion TG was fixed was calculated by a simulation. During the calculation, the thickness of the first alignment film 15 (thickness t2 on the bottom surface bf) was assumed to be completely dependent on the inclination angle θ of the inclined side surface if. Tables 10 to 13 show the results of the calculation.

TABLE 10

| Change in inclination angle [°] | | Depth of recess portion [μm] | Thickness of alignment film [μm] | | Transmissive cell gap [μm] | | Average transmissive cell gap [μm] | |
|---|---|---|---|---|---|---|---|---|
| Before change | After change | | Pixel A | Pixel B | Pixel A | Pixel B | Pixel A | Pixel B |
| 4 | 2.7 | 0.47 | 0.40 | 0.40 | 2.08 | 2.07 | 2.06 | 2.05 |
| 5 | 3.4 | 0.59 | 0.40 | 0.40 | 2.20 | 2.19 | 2.14 | 2.14 |
| 6 | 4.1 | 0.71 | 0.39 | 0.41 | 2.31 | 2.30 | 2.22 | 2.21 |
| 7 | 4.8 | 0.83 | 0.39 | 0.41 | 2.43 | 2.42 | 2.29 | 2.28 |
| 8 | 5.4 | 0.95 | 0.39 | 0.41 | 2.55 | 2.54 | 2.35 | 2.35 |
| 9 | 5.8 | 1.01 | 0.39 | 0.41 | 2.62 | 2.60 | 2.39 | 2.39 |
| 10 | 6.2 | 1.07 | 0.39 | 0.41 | 2.68 | 2.67 | 2.43 | 2.42 |
| 11 | 6.5 | 1.14 | 0.39 | 0.41 | 2.75 | 2.73 | 2.46 | 2.46 |
| 12 | 6.9 | 1.20 | 0.39 | 0.41 | 2.81 | 2.80 | 2.50 | 2.49 |
| 13 | 7.3 | 1.27 | 0.39 | 0.41 | 2.88 | 2.86 | 2.53 | 2.53 |
| 14 | 7.6 | 1.33 | 0.39 | 0.41 | 2.94 | 2.92 | 2.57 | 2.56 |
| 15 | 8.0 | 1.40 | 0.39 | 0.41 | 3.01 | 2.99 | 2.60 | 2.60 |
| 16 | 8.4 | 1.46 | 0.39 | 0.41 | 3.07 | 3.05 | 2.63 | 2.63 |
| 17 | 8.7 | 1.53 | 0.39 | 0.41 | 3.14 | 3.12 | 2.67 | 2.66 |

TABLE 11

| Change in inclination angle [°] | | Depth of recess portion [μm] | Thickness of alignment film [μm] | | Transmissive cell gap [μm] | | Average transmissive cell gap [μm] | |
|---|---|---|---|---|---|---|---|---|
| Before change | After change | | Pixel A | Pixel B | Pixel A | Pixel B | Pixel A | Pixel B |
| 18 | 9.1 | 1.59 | 0.39 | 0.41 | 3.21 | 3.18 | 2.70 | 2.70 |
| 19 | 9.4 | 1.65 | 0.39 | 0.41 | 3.26 | 3.23 | 2.73 | 2.73 |
| 20 | 9.7 | 1.70 | 0.38 | 0.42 | 3.32 | 3.29 | 2.76 | 2.75 |
| 21 | 10.0 | 1.76 | 0.38 | 0.42 | 3.37 | 3.34 | 2.79 | 2.78 |
| 22 | 10.3 | 1.81 | 0.38 | 0.42 | 3.43 | 3.39 | 2.82 | 2.81 |
| 23 | 10.6 | 1.86 | 0.38 | 0.42 | 3.48 | 3.45 | 2.84 | 2.84 |
| 24 | 10.9 | 1.92 | 0.38 | 0.42 | 3.54 | 3.50 | 2.87 | 2.87 |
| 25 | 11.2 | 1.97 | 0.38 | 0.42 | 3.59 | 3.55 | 2.90 | 2.89 |
| 26 | 11.5 | 2.03 | 0.38 | 0.42 | 3.65 | 3.61 | 2.93 | 2.92 |
| 27 | 11.8 | 2.08 | 0.38 | 0.42 | 3.70 | 3.66 | 2.96 | 2.95 |
| 28 | 12.1 | 2.14 | 0.38 | 0.42 | 3.76 | 3.71 | 2.98 | 2.98 |
| 29 | 12.4 | 2.19 | 0.38 | 0.42 | 3.81 | 3.77 | 3.01 | 3.01 |
| 30 | 12.7 | 2.24 | 0.38 | 0.42 | 3.87 | 3.82 | 3.04 | 3.03 |

TABLE 12

| Change in inclination angle [°] | | Transmissive mode efficiency [%] | | Improved value of difference in transmissive mode efficiency [%] | |
|---|---|---|---|---|---|
| Before change | After change | Pixel A | Pixel B | Before improvement | After improvement |
| 4 | 2.7 | 12.98 | 12.93 | 0.089 | 0.054 |
| 5 | 3.4 | 13.90 | 13.84 | 0.098 | 0.054 |
| 6 | 4.1 | 14.73 | 14.67 | 0.107 | 0.054 |
| 7 | 4.8 | 15.51 | 15.45 | 0.117 | 0.054 |
| 8 | 5.4 | 16.26 | 16.20 | 0.126 | 0.054 |
| 9 | 5.8 | 16.66 | 16.61 | 0.166 | 0.054 |
| 10 | 6.2 | 17.06 | 17.00 | 0.208 | 0.054 |
| 11 | 6.5 | 17.45 | 17.40 | 0.250 | 0.054 |
| 12 | 6.9 | 17.84 | 17.79 | 0.292 | 0.054 |
| 13 | 7.3 | 18.23 | 18.18 | 0.334 | 0.055 |
| 14 | 7.6 | 18.62 | 18.57 | 0.377 | 0.055 |
| 15 | 8.0 | 19.01 | 18.95 | 0.420 | 0.055 |
| 16 | 8.4 | 19.39 | 19.33 | 0.463 | 0.058 |
| 17 | 8.7 | 19.78 | 19.72 | 0.507 | 0.061 |

TABLE 13

| Change in inclination angle [°] | | Transmissive mode efficiency [%] | | Improved value of difference in transmissive mode efficiency [%] | |
|---|---|---|---|---|---|
| Before change | After change | Pixel A | Pixel B | Before improvement | After improvement |
| 18 | 9.1 | 20.16 | 20.09 | 0.550 | 0.064 |
| 19 | 9.4 | 20.48 | 20.41 | 0.860 | 0.066 |
| 20 | 9.7 | 20.80 | 20.73 | 1.151 | 0.068 |
| 21 | 10.0 | 21.12 | 21.05 | 1.466 | 0.070 |
| 22 | 10.3 | 21.43 | 21.36 | 1.797 | 0.072 |
| 23 | 10.6 | 21.75 | 21.68 | 2.131 | 0.074 |
| 24 | 10.9 | 22.07 | 21.99 | 2.469 | 0.075 |
| 25 | 11.2 | 22.38 | 22.31 | 2.812 | 0.077 |
| 26 | 11.5 | 22.70 | 22.62 | 3.158 | 0.078 |
| 27 | 11.8 | 23.01 | 22.93 | 3.421 | 0.080 |
| 28 | 12.1 | 23.33 | 23.25 | 3.652 | 0.081 |
| 29 | 12.4 | 23.63 | 23.55 | 3.887 | 0.075 |
| 30 | 12.7 | 23.92 | 23.84 | 4.124 | 0.076 |

From Tables 10 to 13, it is understood that, by decreasing the inclination angle θ of the inclined side surface if of the recess portion TG, the bias of the thickness of the first alignment film 15 is suppressed, and the display quality is improved (difference in the transmissive mode efficiency is decreased).

As understood from these results of the verification, the inclination angle θ of the inclined side surface if of the recess portion TG is decreased (specifically, is made to 25° or less, preferably 22° or less) while maintaining the transmissive cell gap dt relatively large, and thus both sufficiently high transmissive mode efficiency and good display quality can be achieved.

Here, an example of a method of suitably forming the inclined side surface if having a relatively small inclination angle θ will be described.

In a case in which a photosensitive resin material is used as the material of the first interlayer insulating layer 13, first, the photosensitive resin material is added on the reflective layer 12, and subsequently, the photosensitive resin material is irradiated with light (for example, ultraviolet light) via a photomask to be exposed, and then development is performed, as a result, the recess portion TG can be formed. Here, a case in which a positive type photosensitive resin material is used will be described as an example.

Figure 6A:
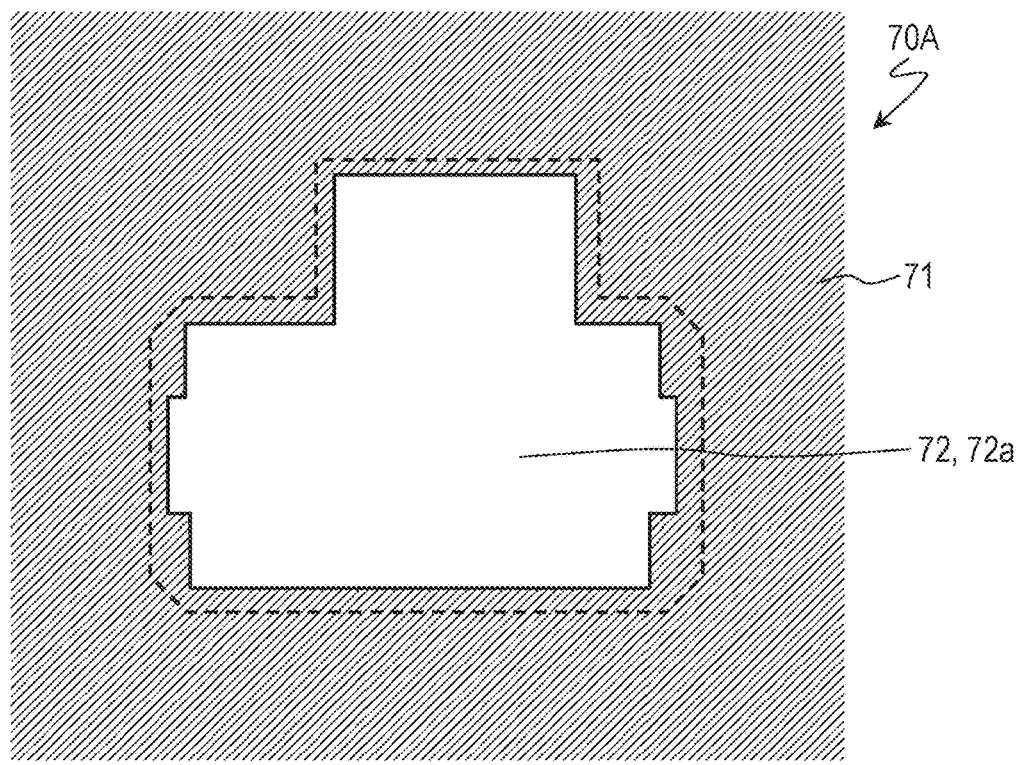
FIG. 6A is a plan view showing a photomask.
Figure 6B:
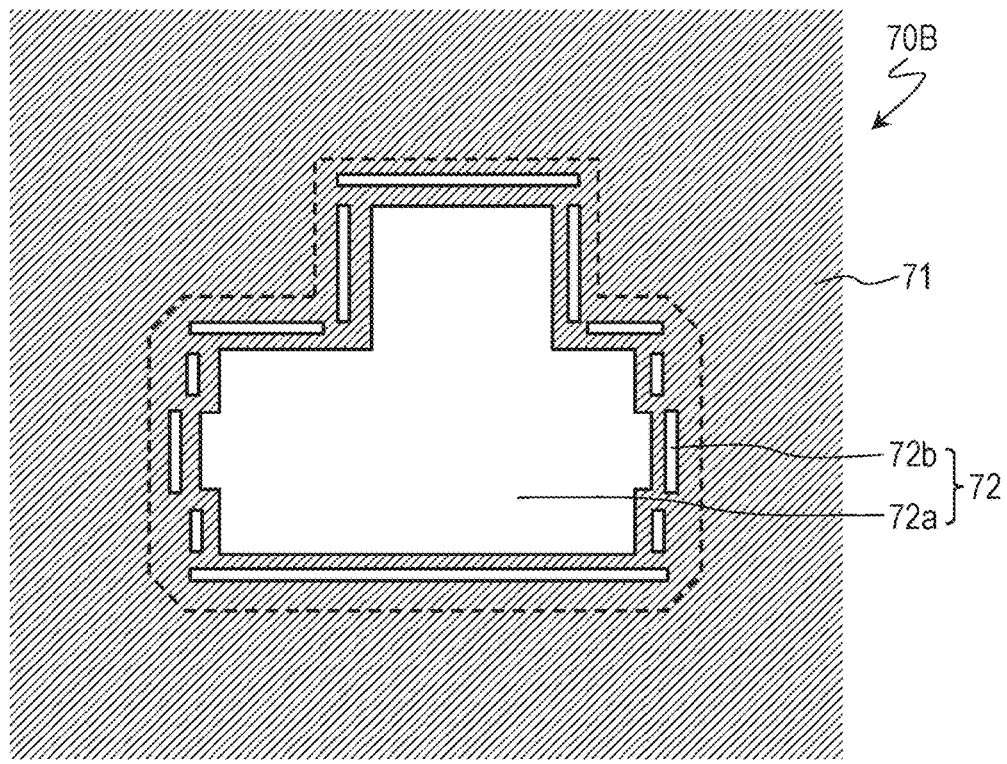
FIG. 6B is a plan view showing a photomask.

FIGS. 6A and 6B show examples of the photomask used in a case of forming the recess portion TG. In FIGS. 6A and 6B, an outer edge of one sub transmissive region is shown by a dotted line.

A photomask 70A shown in FIG. 6A has a light shielding region 71 and a light transmissive region 72. In the photomask 70A, the light transmissive region 72 includes an island-shaped portion 72a disposed corresponding to each sub transmissive region, and the recess portion TG corresponding to one sub transmissive region is formed corresponding to one (single) island-shaped portion 72a.

A photomask 70B shown in FIG. 6B also has the light shielding region 71 and the light transmissive region 72. However, in the photomask 70B, the light transmissive region 72 includes the island-shaped portion 72a and a plurality of slit portions 72b disposed corresponding to each sub transmissive region, and the recess portion TG corresponding to one sub transmissive region is formed corresponding to one island-shaped portion 72a and the plurality of slit portions 72b. The plurality of slit portions 72b are located outside the island-shaped portion 72a and are disposed in the vicinity of the outer edge of the sub transmissive region. A width of the slit portion 72b is a size (for example, 1.0 μm to 2.0 μm) equal to or less than a resolution of an exposure machine.

Figure 7A:
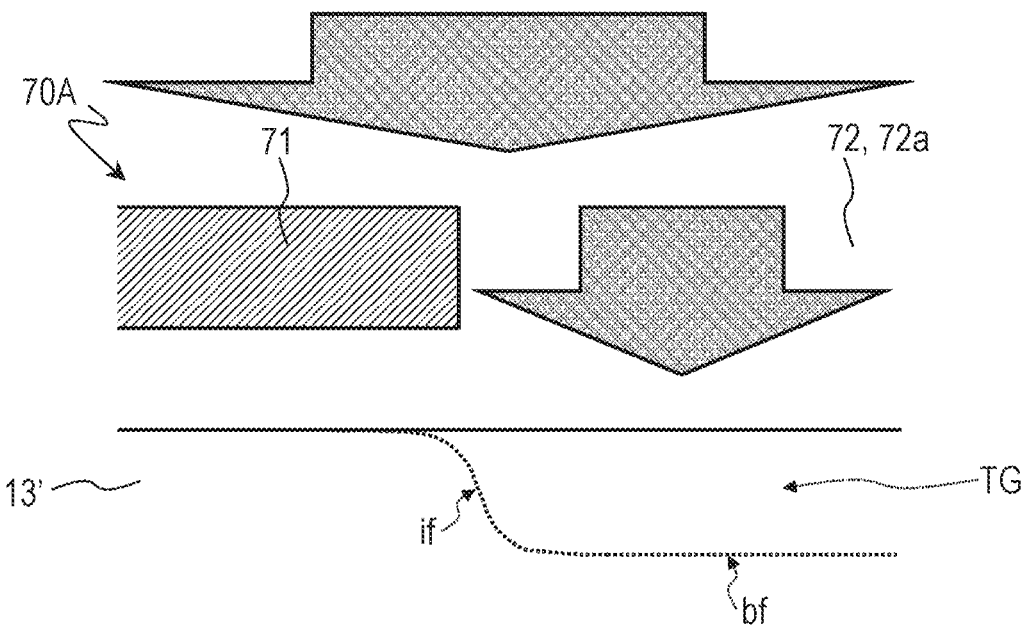
FIG. 7A is a diagram schematically showing a state in which an exposure is performed on a photosensitive resin material by using the photomask.
Figure 7B:
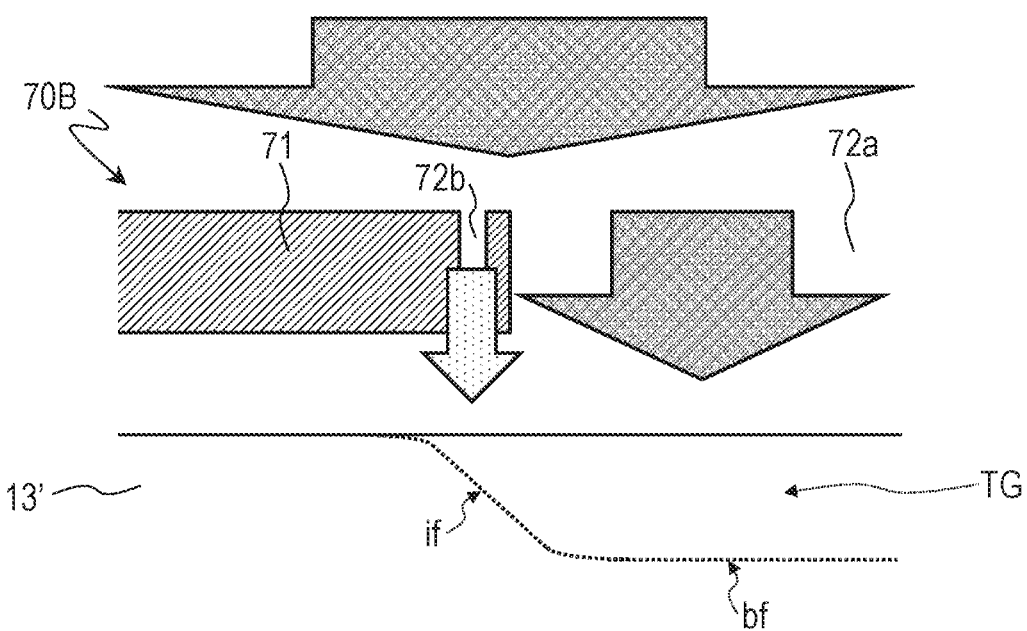
FIG. 7B is a diagram schematically showing a state in which an exposure is performed on the photosensitive resin material using the photomask.

FIGS. 7A and 7B are diagrams schematically showing a state in which the exposure is performed on a photosensitive resin material 13' by using the photomasks 70A and 70B, respectively. In FIGS. 7A and 7B, a cross-sectional shape of the recess portion TG formed after the development is shown by a dotted line.

As can be understood from the comparison of FIGS. 7A and 7B, in a case in which the exposure is performed by using the photomask 70B, the inclined side surface if having a smaller (that is, gentler) inclination angle θ is formed than in a case in which the exposure is performed by using the photomask 70A. This is because, in a case in which the light transmissive region 72 uses the photomask 70B including the slit portion 72b, the exposure is performed with an intermediate light amount on the region serving as the inclined side surface if.

Here, the results of the verification of the effect by including the slit portion in the light transmissive region of the photomask will be described.

Figure 8A:
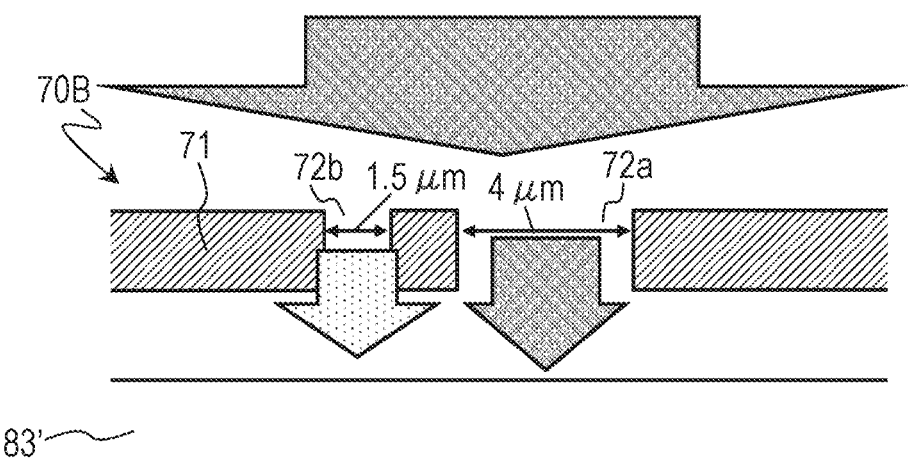
FIG. 8A is a diagram for describing results of verification of an effect by including a slit portion in a light transmissive region of the photomask.
Figure 8B:
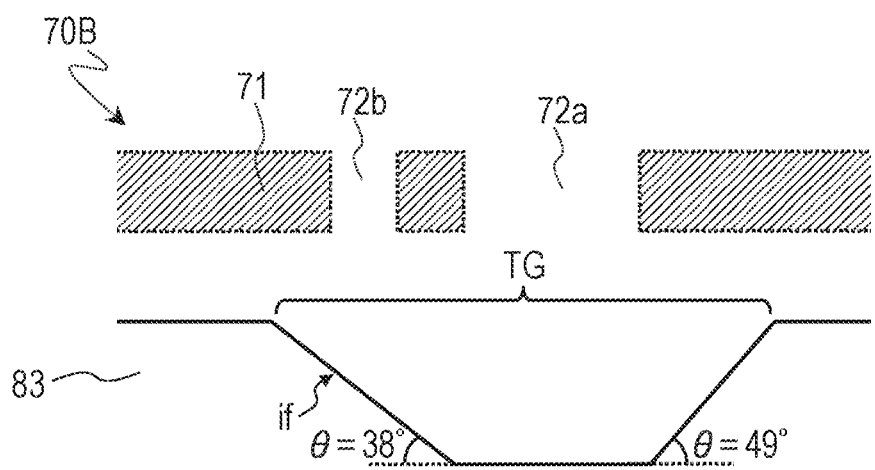
FIG. 8B is a diagram for describing the results of the verification of the effect by including the slit portion in the light transmissive region of the photomask.

As shown in FIG. 8A, the slit portion 72b having a width of 1.5 μm was disposed on one side of the island-shaped portion 72a having a 4 μm square, the photomask 70B in which the slit portion 72b was not disposed was prepared on the other side, and the exposure was performed on a photosensitive resin material 83' by using the photomask 70B. As shown in FIG. 8B, in the recess portion TG of an insulating layer 83 obtained by performing the development thereafter, the inclination angle θ of the inclined side surface if was 38° on the side corresponding to the slit portion 72b, but 49° on the side not corresponding to the slit portion 72b. As described above, it was confirmed that the inclined side surface if having a relatively small inclination angle θ can be suitably formed by including the slit portion in the light transmissive region of the photomask.

Figure 9:
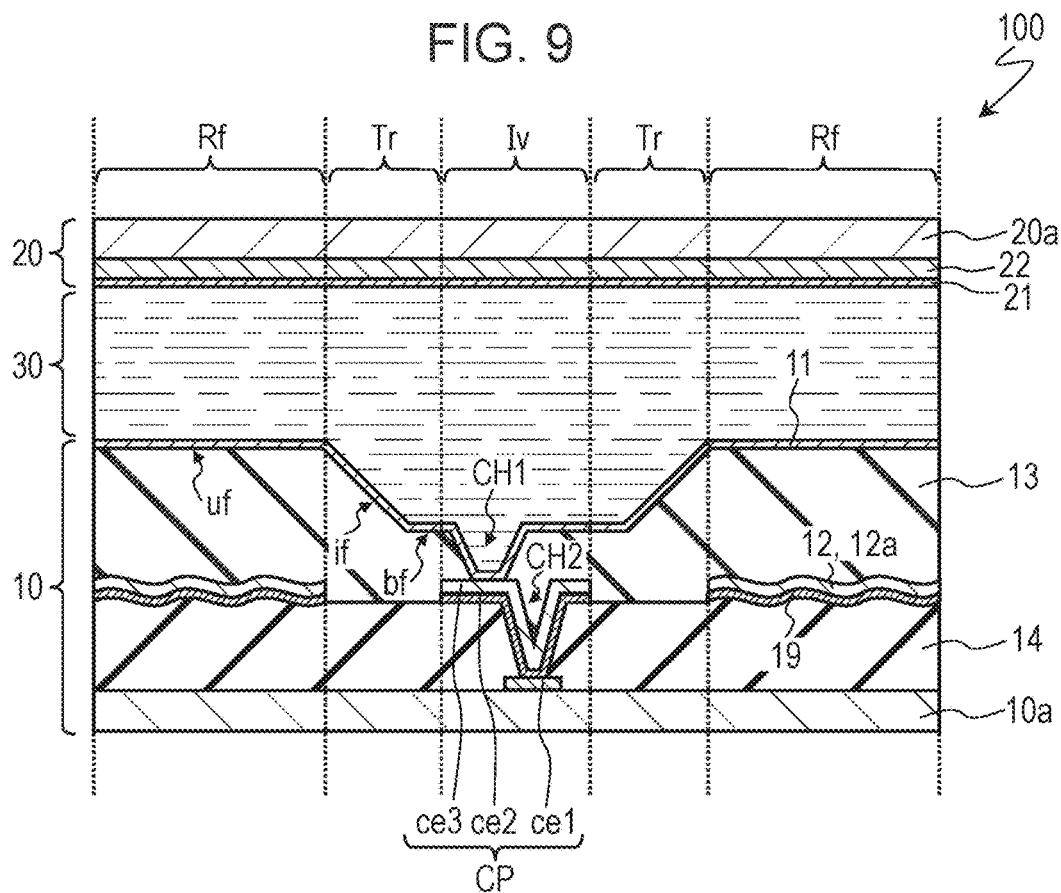
FIG. 9 is a cross-sectional view showing another example of the configuration of the liquid crystal display device.

FIG. 9 shows another example of the configuration of the liquid crystal display device 100 according to the embodiment of the present disclosure. In the example shown in FIG. 2, a part of the bottom surface bf of the recess portion TG and the inclined side surface if are located in the reflective region Rf. On the other hand, in the example shown in FIG. 9, the bottom surface bf and the inclined side surface if of the recess portion TG are located in the transmissive region Tr, and are not included in the reflective region Rf. In a case in which a part of the bottom surface bf of the recess portion TG or the inclined side surface if is located in the reflective region Rf, an effective reflective cell gap dr may be increased, and thus a yellow shift of the reflective whiteness may occur. As in the example shown in FIG. 9, it is possible to suppress the yellow shift of the reflective whiteness because the bottom surface bf and the inclined side surface if of the recess portion TG are not included in the reflective region Rf.

Figure 10:
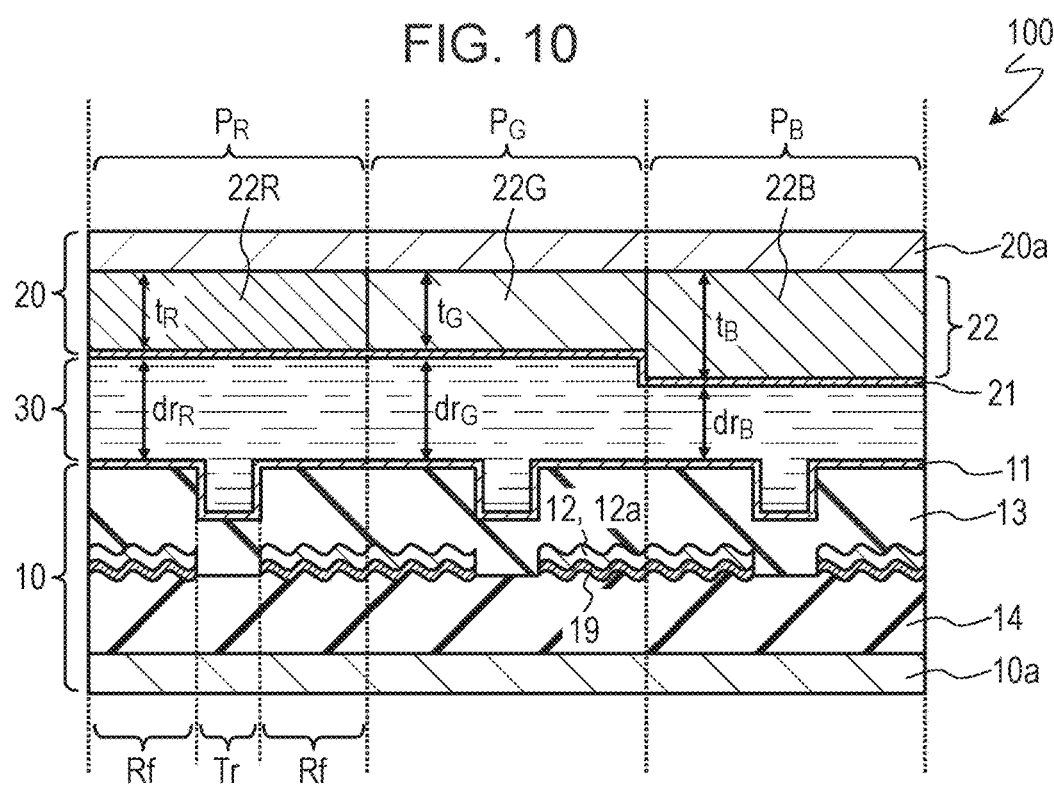
FIG. 10 is a cross-sectional view showing still another example of the configuration of the liquid crystal display device.
Figure 11:
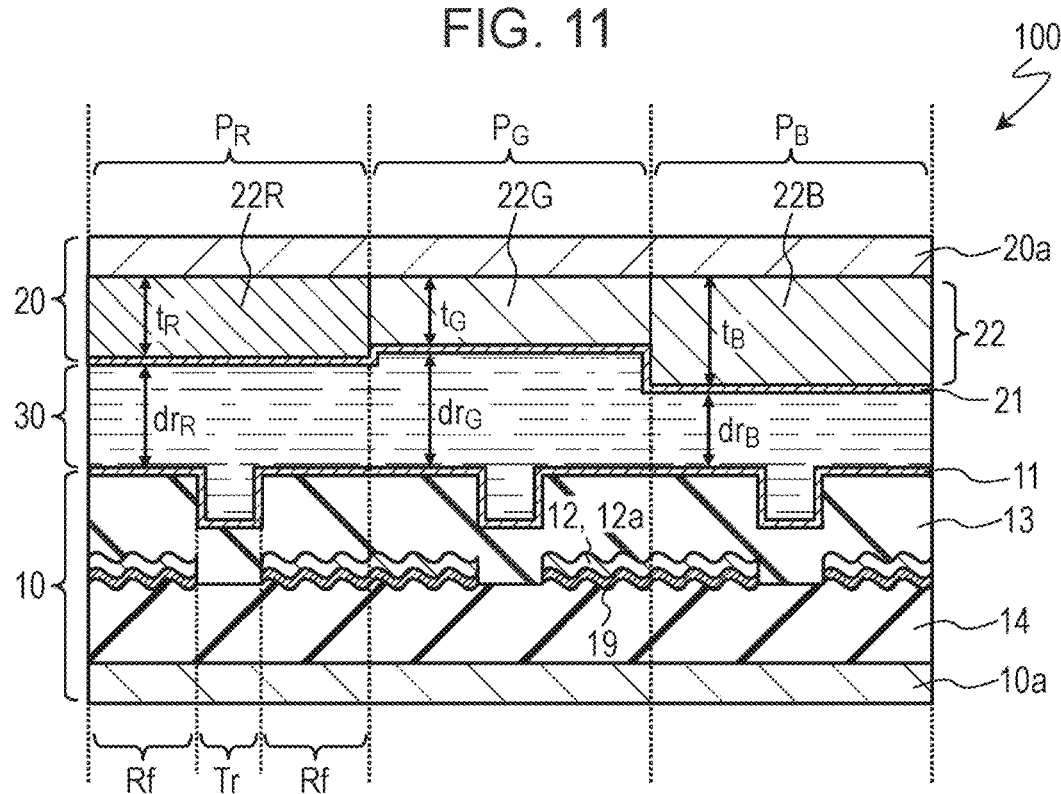
FIG. 11 is a cross-sectional view showing still another example of the configuration of the liquid crystal display device.
Figure 12:
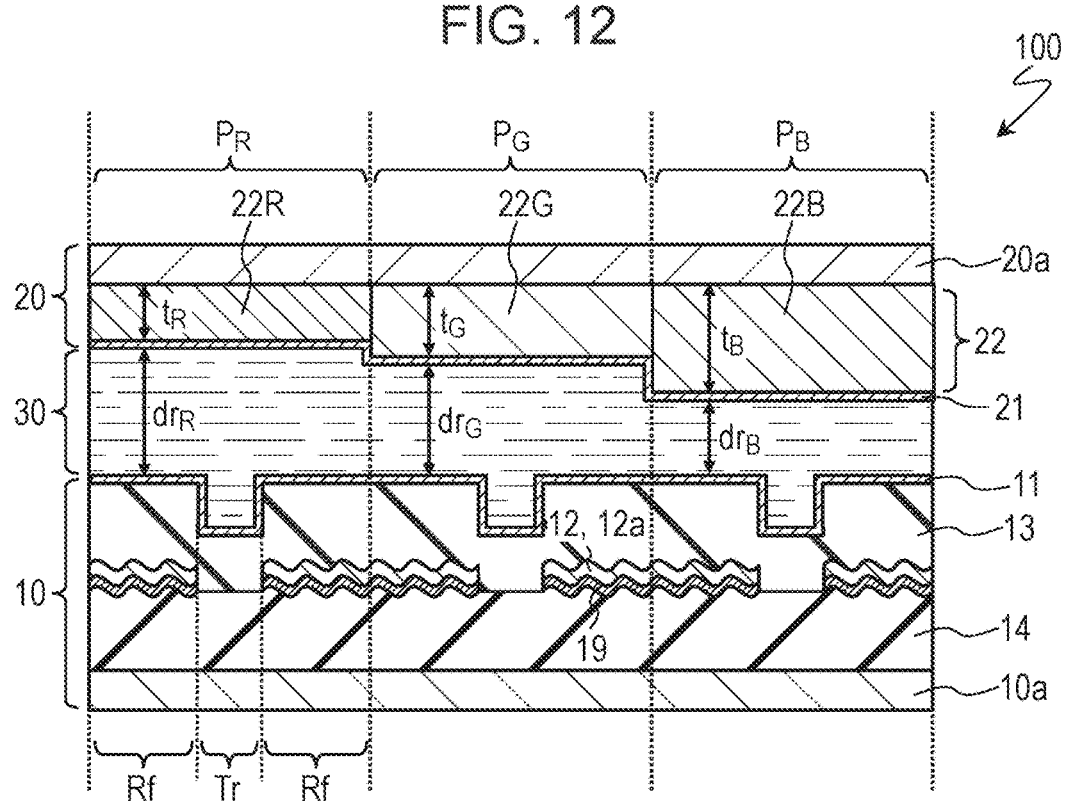
FIG. 12 is a cross-sectional view showing still another example of the configuration of the liquid crystal display device.

Still another example of the configuration of the liquid crystal display device 100 will be described with reference to FIGS. 10, 11, and 12. FIGS. 10, 11, and 12 are cross-sectional views schematically showing the liquid crystal display device 100, and show the regions corresponding to the red pixel $P_R$, the green pixel $P_G$, and the blue pixel $P_B$. In FIGS. 10, 11, and 12, the configuration of the TFT substrate 10 is shown in a simplified manner.

As shown in FIGS. 10, 11, and 12, the color filter layer 22 of the liquid crystal display device 100 includes a red color filter 22R disposed in the red pixel $P_R$, a green color filter 22G disposed in the green pixel $P_G$, and a blue color filter 22B disposed in the blue pixel $P_B$. A thickness t of the blue color filter 22B is larger than each of a thickness $t_R$ of the red color filter 22R and a thickness to of the green color filter 22G. Therefore, a reflective cell gap $dr_B$ of the blue pixel $P_B$ is smaller than each of a reflective cell gap $dr_R$ of the red pixel $P_R$ and a reflective cell gap $dr_G$ of the green pixel $P_G$.

Specifically, in the example shown in FIG. 10, the reflective cell gap $dr_R$ of the red pixel $P_R$ and the reflective cell gap $dr_G$ of the green pixel $P_G$ are the same as each other, and the reflective cell gap $dr_B$ of the blue pixel $P_B$ is smaller than the reflective cell gap $dr_R$ of the red pixel $P_R$ and the reflective cell gap $dr_G$ of the green pixel $P_G$ (that is, $dr_R=dr_G>dr_B$). In addition, in the example shown in FIG. 11, the reflective cell gap $dr_R$ of the red pixel $P_R$ is smaller than the reflective cell gap $dr_G$ of the green pixel $P_G$, and the reflective cell gap $dr_B$ of the blue pixel $P_B$ is smaller than the reflective cell gap $dr_R$ of the red pixel $P_R$ (that is, $dr_G>dr_R>dr_B$). In the example shown in FIG. 12, the reflective cell gap dr of the green pixel $P_G$ is smaller than the reflective cell gap $dr_R$ of the red pixel $P_R$, and the reflective cell gap $dr_B$ of the blue pixel $P_B$ is smaller than the reflective cell gap dr of the green pixel $P_G$ (that is, $dr_R>dr_G>dr_B$).

As described above, in the examples shown in FIGS. 10, 11, and 12, the reflective cell gap $dr_B$ of the blue pixel $P_B$ is smaller than each of the reflective cell gap $dr_R$ of the red pixel $P_R$ and the reflective cell gap $dr_G$ of the green pixel $P_G$. In a case in which the VA-ECB mode is adopted as the display mode, the reflective cell gap $dr_R$ of the red pixel $P_R$, the reflective cell gap $dr_G$ of the green pixel $P_G$, and the reflective cell gap dr of the blue pixel $P_B$ are set as described above, and thus it is possible to suppress a change in the reflection chromaticity due to a fluctuation in the cell gap.

Figure 13:
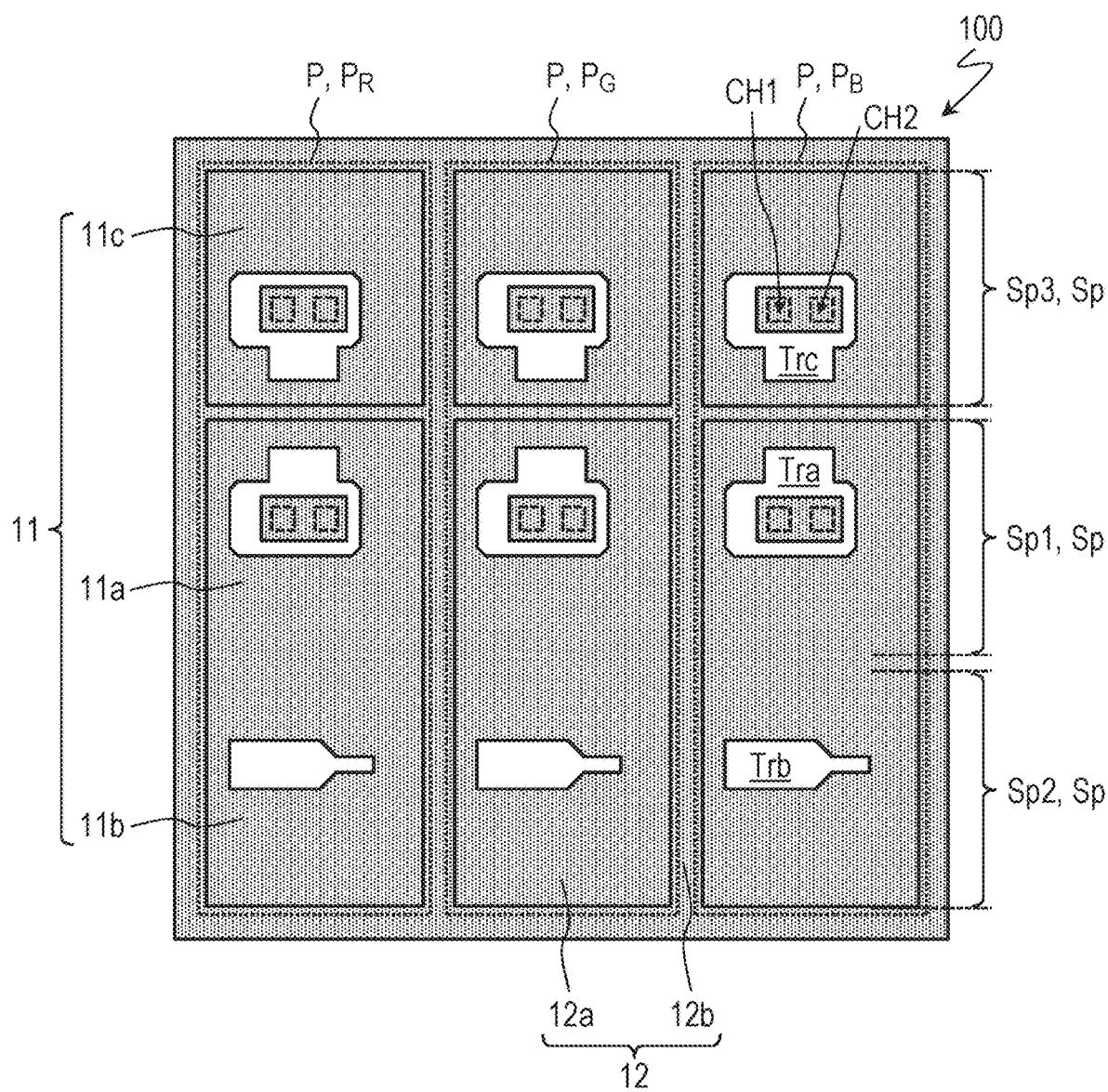
FIG. 13 is a plan view showing the regions corresponding to the three pixels of the liquid crystal display device.

The structure of the pixel electrode 11 is not limited to the example shown in FIG. 1. FIG. 13 shows another example of the structure of the pixel electrode 11.

The example shown in FIG. 13 is different from the example shown in FIG. 1 in that the first sub pixel Sp1 is located at the center in the drawing, and the third sub pixel Sp3 is located on the upper side in the drawing. In other words, the third sub pixel Sp3 is located between the first sub pixel Sp1 and the second sub pixel Sp2 in the example shown in FIG. 1, whereas the first sub pixel Sp1 and the second sub pixel Sp2 are adjacent to each other without the third sub pixel Sp3 interposed therebetween in the example shown in FIG. 13.

In the example shown in FIG. 13, the first sub pixel electrode 11a and the second sub pixel electrode 11b, which are adjacent to each other, are formed to be continuous. In a case in which the first sub pixel electrode 11a and the second sub pixel electrode 11b are collectively referred to as the "first electrode segment", and the third sub pixel electrode 11c is referred to as the "second electrode segment", the first electrode segment has a rectangular shape having a larger aspect ratio than the second electrode segment. The area ratio of the first electrode segment and the second electrode segment may be, for example, about 2:1.

Figure 14:
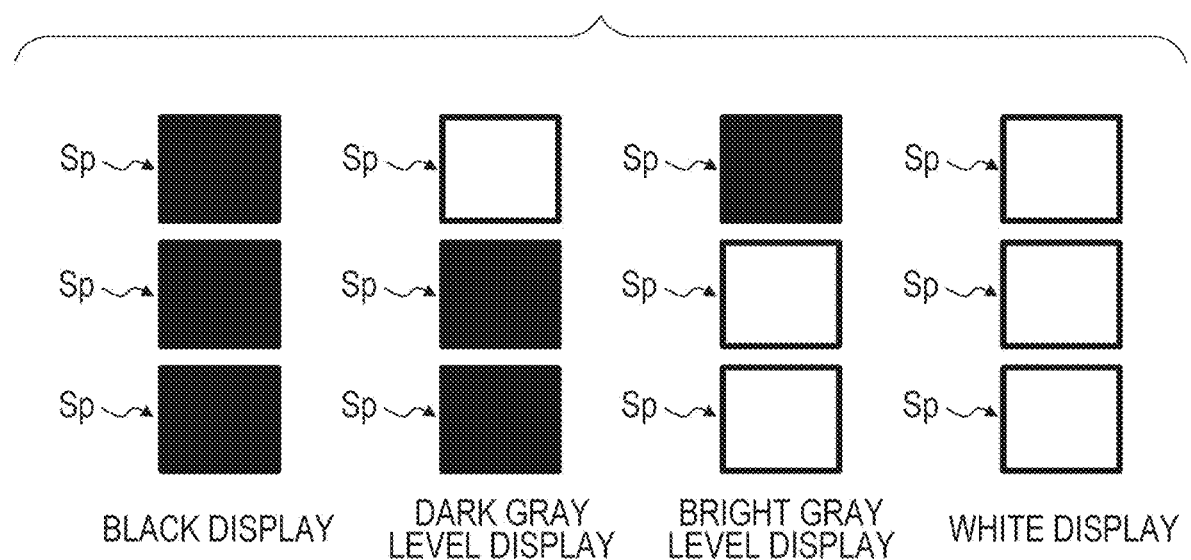
FIG. 14 is a diagram showing an example of gray scale display using the configuration shown in FIG. 13.

In the example shown in FIG. 13 as well, as shown in FIG. 14, the four-gray scale display by the area gray scale method can be performed. Specifically, the black display can be performed on one pixel P as a whole by setting all the three sub pixels Sp in the black display state as shown on the leftmost side of FIG. 14, and the dark gray level display can be performed on one pixel P as a whole by setting two sub pixels Sp in the black display state and setting one sub pixel Sp in the white display state as shown on the second from the left side of FIG. 14. In addition, the bright gray level display can be performed on one pixel P as a whole by setting two sub pixels Sp in the white display state and setting one sub pixel Sp in the black display state as shown on the third from the left side of FIG. 14, and the white display can be performed on one pixel P as a whole by setting all the three sub pixels Sp in the white display state as shown on the rightmost side of FIG. 14.

However, in the example shown in FIG. 13, the clearness of the display of the character and the like may be slightly decreased. The reason thereof will be described below.

In a case in which the character is displayed, only a part of the sub pixels Sp in the pixel P displaying an end portion of the character may be lighted (be in the white display state) in order to represent the smoothness of the character. In a case in which the structure shown in FIG. 13 is adopted, since the positions of the brightness centroid (geometric center of the region in the white display state) are different between a case in which only the first sub pixel Sp1 and the second sub pixel Sp2 are lighted, a case in which only the third sub pixel Sp3 is lighted, and a case in which all the sub pixels Sp are lighted, the brightness is biased. This bias of the brightness causes the decrease of the clearness of the display of the character or a specific pattern.

On the other hand, as in the example shown in FIG. 1, the first electrode segment has a U-shape that interposes the second electrode segment, and thus a difference in the positions of the brightness centroid (geometric center of the region in the white display state) can be reduced (for example, the centroid position can be substantially the same) between a case in which only the first sub pixel Sp1 and the second sub pixel Sp2 are lighted, a case in which only the third sub pixel Sp3 is lighted, and a case in which all the sub pixels Sp are lighted. Therefore, the bias of the brightness can be decreased, and the clearness of the display of the character or the specific pattern can be improved (more natural display can be realized).

Figure 15A:
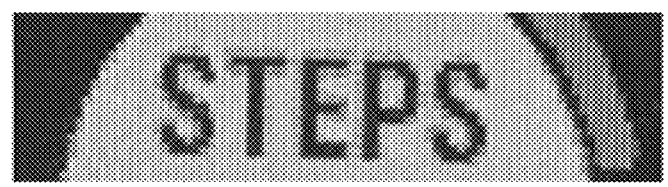
FIG. 15A is a diagram showing an example of actual character display in a case in which an electrode structure shown in FIG. 1 is adopted.
Figure 15B:
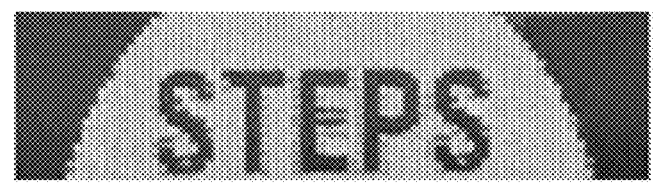
FIG. 15B is a diagram showing an example of actual character display in a case in which an electrode structure shown in FIG. 13 is adopted.

FIG. 15A is a diagram showing an example of actual character display in a case in which the electrode structure shown in FIG. 1 is adopted, and FIG. 15B is a diagram showing an example of actual character display in a case in which the electrode structure shown in FIG. 13 is adopted. It is understood that the character display is smoother in the display example shown in FIG. 15A than in the display example shown in FIG. 15B.

The variation in the shapes of the first electrode segment es1 and the second electrode segment es2 will be described with reference to FIGS. 16A and 16B.

Figure 16A:
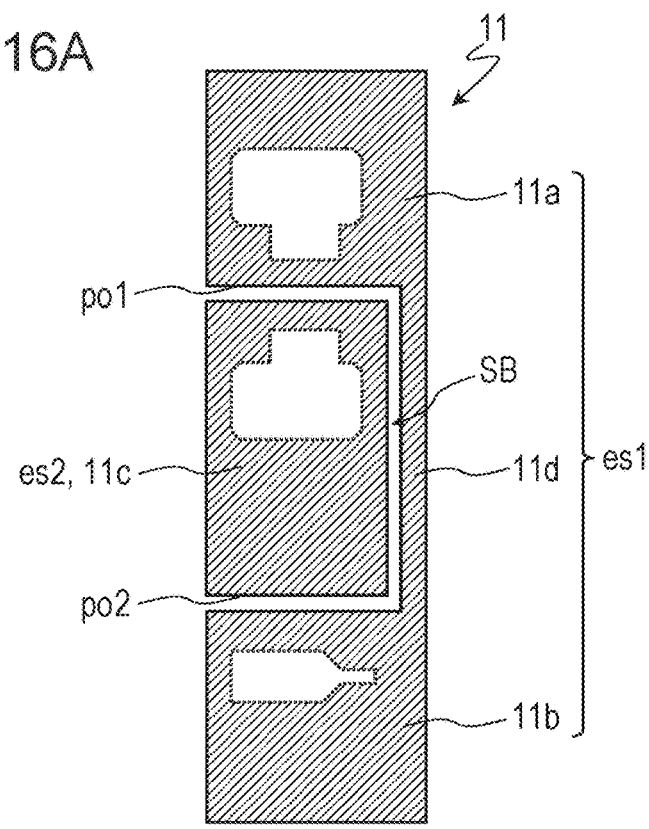
FIG. 16A is a diagram showing a variation in shapes of a first electrode segment and a second electrode segment.
Figure 16B:
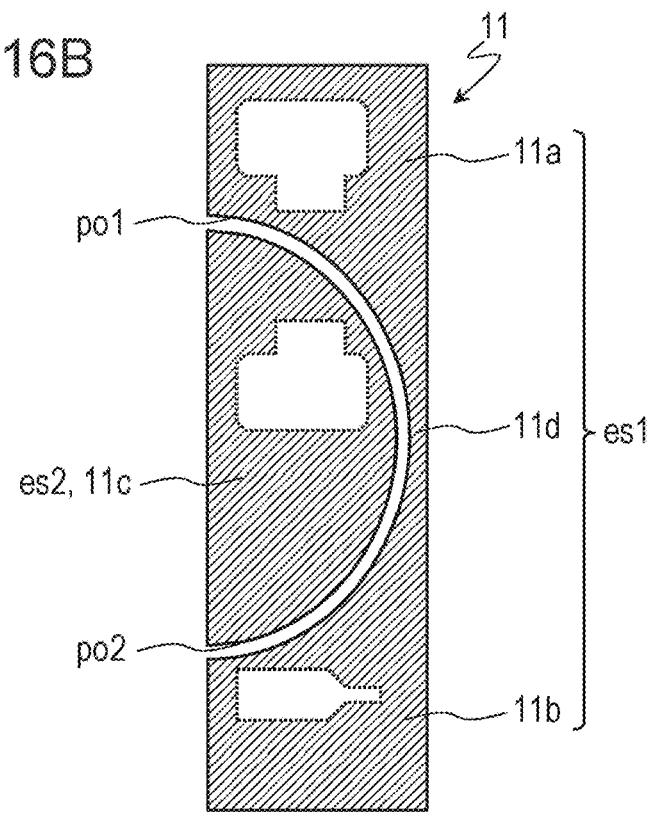
FIG. 16B is a diagram showing the variation in the shapes of the first electrode segment and the second electrode segment.

In both of the pixel electrode 11 shown in FIG. 16A and the pixel electrode 11 shown in FIG. 16B, the first electrode segment es1 has a U-shape that interposes the second electrode segment es2. However, as will be described below, an interval (hereinafter, referred to as a "segment boundary") SB between the first electrode segment es1 and the second electrode segment es2 has a curved shape in the example shown in FIG. 16B, but does not include a curved portion in the example FIG. 16A.

In the pixel electrode 11 shown in FIG. 16A, each of a portion Po1, which defines the segment boundary SB, of the outer edge of the first electrode segment es1 and a portion Po2, which defines the segment boundary, of the outer edge of the second electrode segment es2 is formed of three linear portions, and does not include the curved portion. Therefore, the segment boundary SB does not include the curved portion.

On the other hand, in the pixel electrode 11 shown in FIG. 16B, each of the portion Po1, which defines the segment boundary SB, of the outer edge of the first electrode segment es1 and the portion Po2, which defines the segment boundary, of the outer edge of the second electrode segment es2 has an arc shape, and the second electrode segment es2 has a semicircular shape. Therefore, the segment boundary SB has the curved shape.

As shown in FIG. 16B, in a case in which the segment boundary SB has the curved shape, as compared with a case in which the segment boundary SB does not include the curved portion as shown in FIG. 16A, the aperture ratio can be improved by reducing the area of the segment boundary SB (can be referred to as non-lighting region). In a case in which a certain pixel size was assumed and the area of the reflective region Rf (region indicated by hatching in FIGS. 16A and 16B) was calculated and compared between the example shown in FIG. 16A and the example shown in FIG. 16B, the area was 3512 µm² in the former case and was 3547 µm² in the latter case. In other words, in the example shown in FIG. 16B, the area of the reflective region Rf is increased to 1.01 times as compared with the example shown in FIG. 16A.

The plurality of pixels P of the liquid crystal display device 100 can constitute a plurality of color display pixels. Each color display pixel includes three or more pixels P displaying colors different from each other. For example, one color display pixel is formed of the red pixel $P_R$, the green pixel $P_G$, and the blue pixel $P_B$ shown in FIG. 1.

The embodiment of the present disclosure is suitably used, for example, in a liquid crystal display device in which the resolution is 180 ppi or more, the size of each color display pixel is 140 μm×140 μm or less, and the size of the transmissive region Tr (size of each sub transmissive region in a case in which the transmissive region Tr is divided into the plurality of sub transmissive regions) is 30 μm×30 μm or less.

In the description so far, the configuration in which each pixel P is divided into the plurality of sub pixels Sp is described, but each pixel P does not have to be divided into the plurality of sub pixels Sp.

According to the embodiment of the present disclosure, it is possible to provide the transflective type liquid crystal display device in which the occurrence of the display failure due to the nonuniform cell gap is suppressed. The transflective type liquid crystal display device according to the embodiment of the present disclosure is suitably used as a display device for a smart watch or a digital signage for outdoor advertising.

The present disclosure contains subject matter related to that disclosed in Japanese Priority Patent Application JP 2022-190113 filed in the Japan Patent Office on Nov. 29, 2022 and Japanese Priority Patent Application JP 2023-124430 filed in the Japan Patent Office on Jul. 31, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
a first substrate;
a second substrate provided opposite to the first substrate;
a liquid crystal layer provided between the first substrate and the second substrate; and
a plurality of pixels arranged in a matrix including a plurality of rows and a plurality of columns,
wherein each of the plurality of pixels includes a reflective region for performing display in a reflective mode and a transmissive region for performing display in a transmissive mode,
the first substrate includes
a reflective layer,
an interlayer insulating layer provided to cover the reflective layer,
a pixel electrode provided on the interlayer insulating layer in each of the plurality of pixels, and
a backplane circuit that drives the plurality of pixels,
the interlayer insulating layer has a contact hole for electrically connecting the pixel electrode to the backplane circuit in the transmissive region,
the interlayer insulating layer further has a recess portion defined by a bottom surface and an inclined side surface, and at least a part of the recess portion is located in the transmissive region,
a depth of the recess portion is 0.5 μm or more, and
an inclination angle of the inclined side surface of the recess portion is 25° or less.

2. The liquid crystal display device according to claim 1, wherein the inclination angle of the inclined side surface of the recess portion is 22° or less.

3. The liquid crystal display device according to claim 1, wherein the bottom surface and the inclined side surface of the recess portion are located in the transmissive region.

4. The liquid crystal display device according to claim 1, wherein the reflective layer has an uneven surface structure.

5. The liquid crystal display device according to claim 1, wherein the reflective layer has a substantially flat surface.

6. The liquid crystal display device according to claim 1, wherein the liquid crystal layer is a vertical alignment type.

7. The liquid crystal display device according to claim 1, wherein the liquid crystal layer is a horizontal alignment type.

8. A liquid crystal display device comprising:
a first substrate;
a second substrate provided opposite the first substrate;
a liquid crystal layer provided between the first substrate and the second substrate; and
a plurality of pixels arranged in a matrix including a plurality of rows and a plurality of columns,
wherein each of the plurality of pixels includes a reflective region for performing display in a reflective mode and a transmissive region for performing display in a transmissive mode,
the first substrate includes
a reflective layer,
an interlayer insulating layer provided to cover the reflective layer, and
a pixel electrode provided on the interlayer insulating layer in each of the plurality of pixels,
the interlayer insulating layer has a recess portion defined by a bottom surface and an inclined side surface, and at least a part of the recess portion is located in the transmissive region,
a depth of the recess portion is 0.5 μm or more,
an inclination angle of the inclined side surface of the recess portion is 25° or less,
the transmissive region of each pixel includes a plurality of sub transmissive regions separated from each other, and
the plurality of sub transmissive regions includes a first sub transmissive region including a contact hole and a second sub transmissive region not including the contact hole.

9. The liquid crystal display device according to claim 8, wherein each pixel of the plurality of pixels further includes a plurality of sub pixels,
the plurality of sub pixels includes a first sub pixel including the first sub transmissive region and a second sub pixel including the second sub transmissive region,
the pixel electrode includes a plurality of sub pixel electrodes,
the plurality of sub pixel electrodes includes a first sub pixel electrode disposed in the first sub pixel and a second sub pixel electrode disposed in the second sub pixel, and
the first sub pixel electrode and the second sub pixel electrode are electrically connected to each other.

10. The liquid crystal display device according to claim 9, wherein the pixel electrode further includes a connection electrode that connects the first sub pixel electrode to the second sub pixel electrode, and
the first sub pixel electrode, the second sub pixel electrode, and the connection electrode have a U-shape as a whole.

11. The liquid crystal display device according to claim 10,
wherein the plurality of sub transmissive regions further includes a third sub transmissive region including the contact hole,
the plurality of sub pixels further includes a third sub pixel including the third sub transmissive region, and
the plurality of sub pixel electrodes further include a third sub pixel electrode disposed in the third sub pixel and located between the first sub pixel electrode and the second sub pixel electrode.

12. The liquid crystal display device according to claim 11,
wherein, in a case in which the first sub pixel electrode, the second sub pixel electrode, and the connection electrode are referred to as a first electrode segment, the third sub pixel electrode is referred to as a second electrode segment, and an interval between the first electrode segment and the second electrode segment is referred to as a segment boundary,
the segment boundary has a curved shape.

13. The liquid crystal display device according to claim 12,
wherein a portion, which defines the segment boundary, of an outer edge of the first electrode segment and a portion, which defines the segment boundary, of an outer edge of the second electrode segment each have an arc shape.

14. The liquid crystal display device according to claim 1, wherein the first substrate has an alignment film provided to be in contact with the liquid crystal layer.

15. The liquid crystal display device according to claim 1, wherein the plurality of pixels comprises a plurality of color display pixels,
each of the plurality of color display pixels includes three or more pixels displaying colors different from each other,
a resolution is 180 ppi or more,
a size of each color display pixel is 140 μm×140 μm or less, and
a size of the transmissive region is 30 μm×30 μm or less.

16. The liquid crystal display device according to claim 1,
wherein a thickness of the liquid crystal layer in the reflective region is 2.0 μm or more and 2.5 μm or less, and
a thickness of the liquid crystal layer in the transmissive region is 3.0 μm or more and 3.8 μm or less.

17. The liquid crystal display device according to claim 1,
wherein the plurality of pixels includes a red pixel displaying red, a green pixel displaying green, and a blue pixel displaying blue, and
a thickness of the liquid crystal layer in the reflective region of the blue pixel is smaller than each of a thickness of the liquid crystal layer in the reflective region of the red pixel and a thickness of the liquid crystal layer in the reflective region of the green pixel.

18. The liquid crystal display device according to claim 17,
wherein the second substrate includes a color filter layer,
the color filter layer includes a red color filter disposed in the red pixel, a green color filter disposed in the green pixel, and a blue color filter disposed in the blue pixel, and
a thickness of the blue color filter is larger than each of a thickness of the red color filter and a thickness of the green color filter.

\* \* \* \* \*